(12) United States Patent
Li et al.

(10) Patent No.: US 11,442,354 B2
(45) Date of Patent: Sep. 13, 2022

(54) PROJECTION SCREEN AND PROJECTION SYSTEM

(71) Applicant: HISENSE LASER DISPLAY CO., LTD., Shandong (CN)

(72) Inventors: Jianjun Li, Shandong (CN); Changming Yang, Shandong (CN); Qiang Zhong, Shandong (CN); Yun Zhao, Shandong (CN)

(73) Assignee: HISENSE LASER DISPLAY CO., LTD., Shandong (CN)

( * ) Notice: Subject to any disclaimer, the term of this patent is extended or adjusted under 35 U.S.C. 154(b) by 0 days.

(21) Appl. No.: 17/182,701

(22) Filed: Feb. 23, 2021

(65) Prior Publication Data
US 2021/0173293 A1 Jun. 10, 2021

Related U.S. Application Data

(63) Continuation-in-part of application No. PCT/CN2019/101428, filed on Aug. 19, 2019.

(30) Foreign Application Priority Data

Aug. 29, 2018 (CN) .......................... 201810998499.8

(51) Int. Cl.
*G03B 21/60* (2014.01)
*G03B 21/56* (2006.01)
*G03B 21/64* (2006.01)

(52) U.S. Cl.
CPC .............. *G03B 21/60* (2013.01); *G03B 21/56* (2013.01); *G03B 21/64* (2013.01)

(58) Field of Classification Search
CPC ......... G03B 21/56; G03B 21/60; G03B 21/64
(Continued)

(56) References Cited

U.S. PATENT DOCUMENTS 5,185,677 A 2/1993 Honda et al.
6,084,707 A * 7/2000 Maruyama ........... G03B 21/625
359/450

(Continued)

FOREIGN PATENT DOCUMENTS

CN 2681172 Y 2/2005
CN 101042522 A 9/2007
(Continued)

OTHER PUBLICATIONS

First Office Action issued in corresponding Chinese Application No. 201811005356.9 dated Jul. 27, 2020, with English translation.
(Continued)

*Primary Examiner* — Christopher E Mahoney
(74) *Attorney, Agent, or Firm* — Morgan, Lewis & Bockius LLP

(57) ABSTRACT

A projection screen includes a screen board, a connecting cloth, a screen frame, and at least one connecting member. The screen board has a first surface and a second surface opposite, the screen board has a light receiving region and an edge region surrounding the light receiving region. At least one edge of the connecting cloth protrudes from a corresponding edge of the screen board, and at least a portion of the second surface of the screen board located in the edge region is connected to the connecting cloth. The screen frame has a hollow structure, an orthographic projection of the screen board on a plane parallel to the first surface is located within an outer border of an orthographic projection of the screen frame on the plane. The at least one connecting member connects at least one edge of the connecting cloth to the screen frame.

20 Claims, 12 Drawing Sheets

(58) Field of Classification Search
USPC .................................................. 359/443, 449
See application file for complete search history.

(56) References Cited

U.S. PATENT DOCUMENTS

| | | | |
|---|---|---|---|
| 6,459,531 B1* | 10/2002 | Min | H04N 9/3141 |
| | | | 348/904 |
| 6,501,599 B1 | 12/2002 | Randolph et al. | |
| 9,551,920 B2* | 1/2017 | Risher | G03B 21/56 |
| 2007/0086088 A1* | 4/2007 | Astill | G03B 21/58 |
| | | | 359/443 |
| 2007/0222951 A1 | 9/2007 | Makida et al. | |
| 2008/0062516 A1 | 3/2008 | Stewart et al. | |
| 2013/0141783 A1* | 6/2013 | Risher | G03B 21/565 |
| | | | 359/450 |
| 2016/0018725 A1* | 1/2016 | Sharp | G03B 21/562 |
| | | | 359/446 |
| 2021/0127187 A1* | 4/2021 | Zhou | H04N 9/3141 |

FOREIGN PATENT DOCUMENTS

| | | | | |
|---|---|---|---|---|
| CN | 200950203 | Y | 9/2007 | |
| CN | 201134007 | Y | 10/2008 | |
| CN | 201174025 | Y | 12/2008 | |
| CN | 201583781 | U | 9/2010 | |
| CN | 102253582 | A | 11/2011 | |
| CN | 202050490 | U | 11/2011 | |
| CN | 202257017 | U | 5/2012 | |
| CN | 202548518 | U | 11/2012 | |
| CN | 202837795 | U | 3/2013 | |
| CN | 203941373 | U | 11/2014 | |
| CN | 204790295 | U | 11/2015 | |
| CN | 204903939 | U | 12/2015 | |
| CN | 205281106 | U | 6/2016 | |
| CN | 205608375 | U | 9/2016 | |
| CN | 106125492 | A | 11/2016 | |
| CN | 205963607 | U | 2/2017 | |
| CN | 206209277 | U | 5/2017 | |
| CN | 206470528 | U | 9/2017 | |
| CN | 206541120 | U | 10/2017 | |
| CN | 107575723 | A | 1/2018 | |
| CN | 206930893 | U | 1/2018 | |
| CN | 108388074 | A | 8/2018 | |
| CN | 108398850 | A | 8/2018 | |
| CN | 108681201 | A | 10/2018 | |
| CN | 108983544 | A | 12/2018 | |
| EP | 1 804 118 | A2 | 7/2007 | |
| JP | H04-40439 | A | 2/1992 | |
| KR | 200426756 | Y1 * | 9/2006 | F16M 13/02 |
| KR | 10-2015-0002144 | A | 1/2015 | |

OTHER PUBLICATIONS

International Search Report and Written Opinion issued in corresponding International Application No. PCT/CN2018/094512 dated Dec. 7, 2018, with English translation.
First Office Action issued in corresponding Chinese Application No. 201810998499.8 dated Oct. 25, 2019, with English translation.
Second Office Action issued in corresponding Chinese Application No. 201810998499.8 dated Mar. 16, 2020, with English translation.
Third Office Action issued in corresponding Chinese Application No. 201810998499.8 dated Aug. 5, 2020, with English translation.
International Search Report and Written Opinion issued in corresponding International Application No. PCT/CN2019/101428 dated Nov. 19, 2019, with English translation.
Office Action issued in corresponding Chinese Patent Application No. 202011212002.9 dated Jul. 13, 2021, with English translation.
Office Action issued in corresponding Chinese Patent Application No. 202011212005.2 dated Jul. 13, 2021, with English translation.

* cited by examiner

PROJECTION SCREEN AND PROJECTION SYSTEM

CROSS-REFERENCE TO RELATED APPLICATIONS

This application is a Continuation-in-Part application of PCT/CN2019/101428 filed on Aug. 19, 2019, which claims priority to Chinese Patent Application No. 201810998499.8 filed on Aug. 29, 2018, which are incorporated herein by reference in their entirety.

TECHNICAL FIELD

The present disclosure relates to the field of projection display technologies, and in particular, to a projection screen and a projection system.

BACKGROUND

With the continuous development of science and technology, projection display systems are increasingly applied to people's work and life. Laser projection is gradually occupying the market because of its advantages such as wide color gamut, high brightness, and long service life.

SUMMARY

In one aspect, a projection screen is provided, which includes a screen board, a connecting cloth, a screen frame, and at least one connection member. The screen board has a first surface and a second surface opposite to each other. The screen board has a light receiving region and an edge region surrounding the light receiving region. The connecting cloth is disposed on the second surface of the screen board. At least one edge of the connecting cloth protrudes from a corresponding edge of the screen board. At least a portion of the second surface of the screen board located in the edge region is connected to the connecting cloth. The screen frame has a hollow structure. An orthographic projection of the screen board on a plane parallel to the first surface is located within an outer border of an orthographic projection of the screen frame on the plane. Each edge of the connecting cloth being connected to the screen frame. The at least one connecting member connects the at least one edge of the connecting cloth to the screen frame, and the at least one connecting member is configured to provide a tension to the connecting cloth.

In another aspect, a projection system is provided, including a projection device and the projection screen as described above. The projection device is configured to project images onto the screen board of the projection screen.

BRIEF DESCRIPTION OF THE DRAWINGS

In order to describe technical solutions in embodiments of the present disclosure more clearly, the accompanying drawings to be used in the description of the embodiments will be introduced briefly. However, the accompanying drawings to be described below are merely accompanying drawings of some embodiments of the present disclosure, and a person of ordinary skill in the art can obtain other drawings according to these drawings without paying any creative effort. In addition, the drawings in the following description may be regarded as schematic diagrams, and are not limitations on actual sizes of products, etc. that the embodiments of the present disclosure related to.

DETAILED DESCRIPTION

Figure 1:
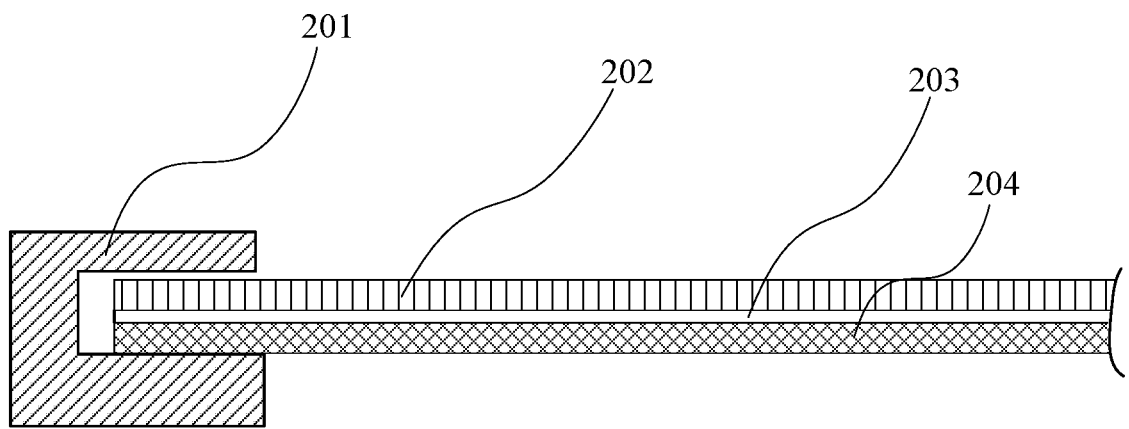
FIG. 1 is a schematic diagram of a projection screen.

Technical solutions in some embodiments of the present disclosure will be described below clearly and completely in combination with accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a plurality of/the plurality of" or "multiple" means two or more unless otherwise specified.

In the description of some embodiments, the term "connected" and its extensions may be used. For example, the term "connected" may be used in the description of some embodiments to indicate that two or more components are directly connected to each other or indirectly connected through other structures. The embodiments disclosed herein are not necessarily limited in this context.

"A and/or B" includes the following three situations: only A, A and B, and only B.

The use of "suitable for" or "configured to" herein means open and inclusive language, which does not exclude devices that are suitable for or configured to perform additional tasks or steps.

"Approximately" or "the same" as used herein is inclusive of the stated value and means within an acceptable range of deviation for the particular value as determined by one of ordinary skill in the art, considering the measurement in question and the error associated with measurement of the particular quantity (i.e., the limitations of the measurement system). It will be noted that "approximately" is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

Exemplary embodiments are described herein with reference to sectional views and/or plan views that are schematic illustrations of idealized embodiments. In the drawings, thicknesses of layers and regions may be exaggerated for clarity. Exemplary embodiments of the present disclosure should not be construed as being limited to the shapes of the regions as illustrated herein, but are to include deviations in shapes that result, for example, from manufacturing.

A projection system generally includes a projection screen, which includes a soft screen or a hard screen. As a size of a projection screen continues to increase (currently, a size of the projection screen is usually above 80 inches), the projection screen may further include a fixing structure provided on a rear face of the hard screen, so as to fix the relatively fragile hard screen and ensure the flatness of the hard screen. As shown in FIG. 1, the fixing structure includes a decorative frame 201 and a support plate 204. The support plate 204, which is rigid, is bonded to the rear face of the hard screen 202 through a glue layer 203. The decorative frame 201, having a U-shaped section, wraps edges of both the hard screen 202 and the support plate 204, and is connected to the support plate 204. In this way, the flatness of the hard screen 202 may be maintained through the support plate 204 to avoid the deformation of the hard screen 202.

However, in a case where the hard screen 202 is fixed by using the fixing structure, since an area of the support plate 204 is large, deformation phenomena such as bulges are prone to occur on the large-sized support plate 204 during processing. Moreover, in a case where the support plate 204 is bonded to the hard screen 202 through the glue layer 203, the uneven coating of the glue may also cause unevenness of the glue layer 203, thereby affecting the flatness of the hard screen 202. In addition, this kind of fixing structure may cause the weight of the projection screen to be large, and thus is not convenient to transport and hang, and is not conducive to the enlargement of the size of the projection screen.

Referring to FIGS. 3 to 15, some embodiments of the present disclosure provide a projection screen. The projection screen includes a screen board 1, a connecting cloth 2, a screen frame 3, and at least one connecting member 4.

Figure 4:
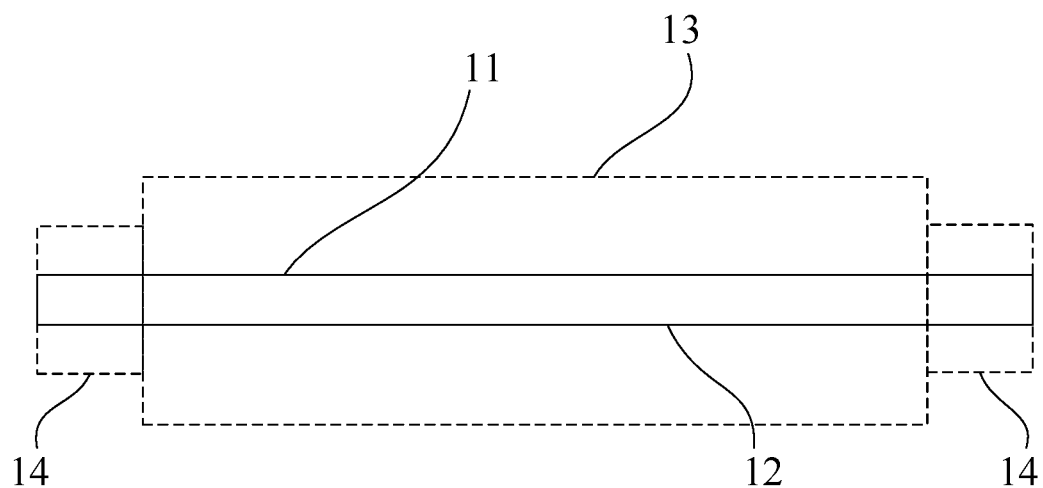
FIG. 4 is a side view of a screen board, in accordance with some embodiments.

As shown in FIG. 4, the screen board 1 has a first surface 11 and a second surface 12 opposite to each other. The first surface 11 of the screen board 1 is a light receiving surface. The screen board 1 has a light receiving region 13 configured to receive light projected onto the screen board 1 and an edge region 14 surrounding the light receiving region 13. In the embodiments of the present disclosure, an image is projected on the light receiving region 13 along a direction pointing to the first surface 11 of the screen board 1.

In some embodiments, the screen board 1 is a hard screen. The hard screen is relative to a soft screen. The soft screen may be curled as a whole for easy retracting, while the hard screen cannot be curled and has a certain hardness, brittleness and rigidity.

Figure 2:
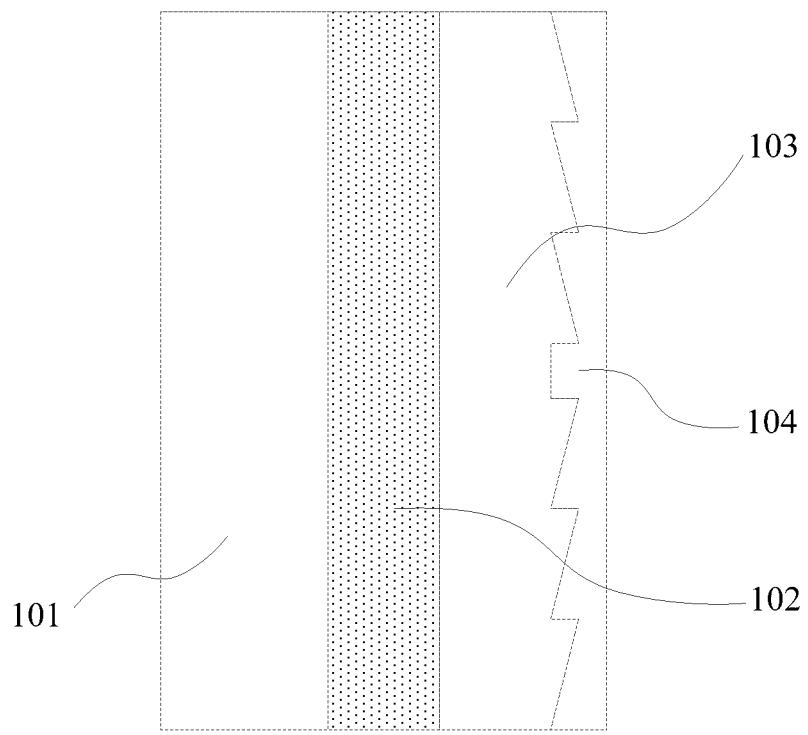
FIG. 2 is a schematic diagram of a hard screen, in accordance with some embodiments.

In some examples, the hard screen includes a plurality of optical structure layers. For example, as shown in FIG. 2, the plurality of optical structure layers includes a substrate layer 101, a diffusion layer 102, a Fresnel lens layer 103, and a reflective layer 104 that are sequentially arranged.

For example, the substrate layer 101 is an outermost layer of the plurality of optical structure layers, and a surface of the substrate layer 101 facing away from the diffusion layer 102 is the first surface 11 of the screen board 1. The substrate layer 101 may include a colored layer and a hard, or protective, layer disposed on a side of the colored layer away from the diffusion layer 102. The colored layer may allow light beams to pass through to improve a color reproduction ability of the hard screen. The protective layer mainly plays a protective role, and is made of a hard material, such as acrylic (PMMA), copolymer of methyl methacrylate-styrene (MS), polystyrene plastic (PS) or polycarbonate (PC).

The diffusion layer 102 is configured to homogenize uneven incident light and to make light exiting therefrom have a larger exit angle. The Fresnel lens layer 103 is configured to collimate the light beams incident thereon at angles within a certain angle range so that light beams exiting therefrom are parallel, and to diverge the light beams reflected by the reflective layer 104. The reflective layer 104 is generally an aluminum reflective film, and the reflective layer 104 is disposed on a surface of the Fresnel lens layer 103 facing away from the diffusion layer 102.

In some examples, the screen board 1 is in a shape of a rectangle. Of course, the screen board 1 may also have other regular or irregular shapes, which is not limited in the embodiments of the present disclosure.

Figure 7:
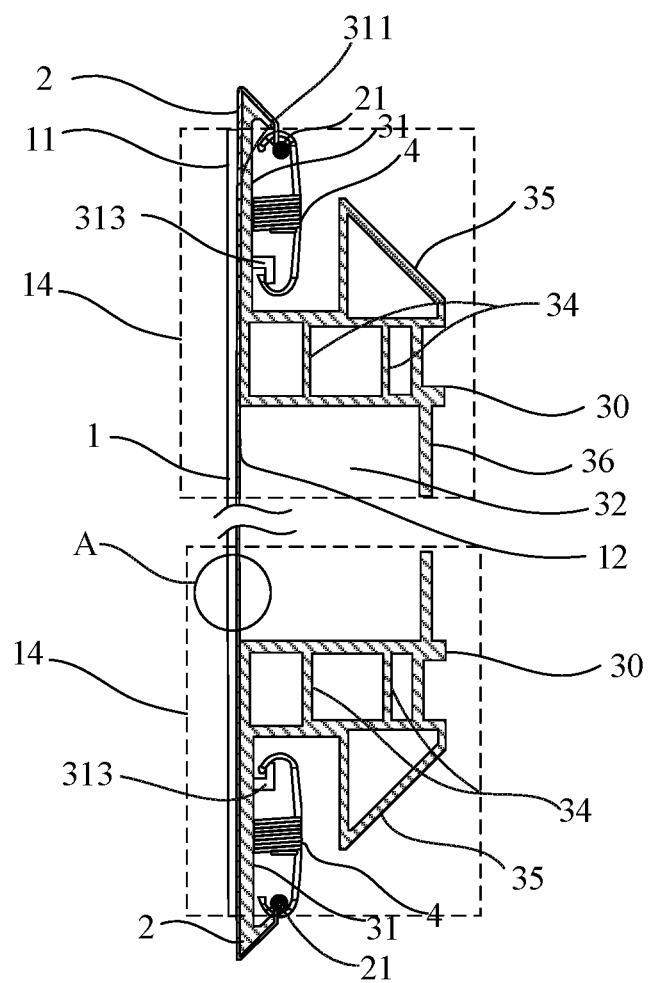
FIG. 7 is a cross-sectional view taken along line I-I' in FIG. 6.
Figure 8:
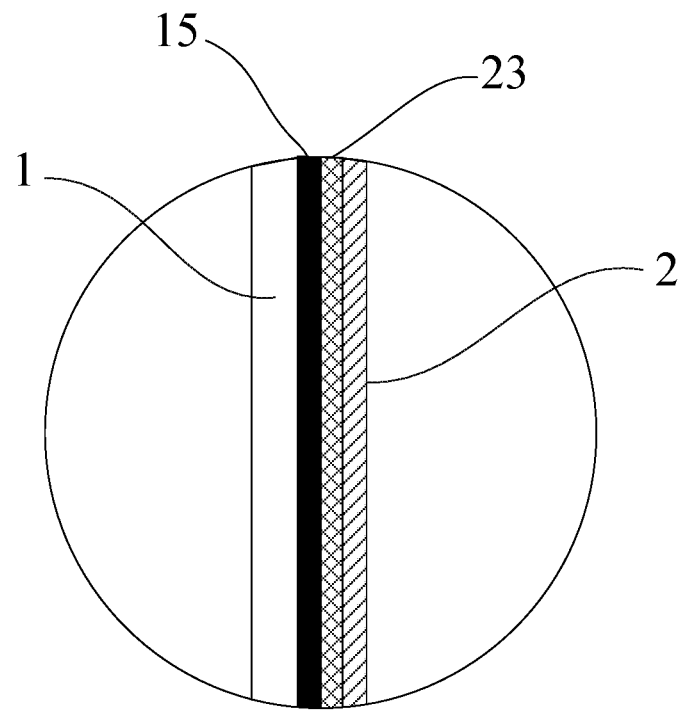
FIG. 8 is an enlarged diagram of region A in FIG. 7.

In some embodiments, as shown in FIGS. 7 and 8, the connecting cloth 2 is disposed on the second surface 12 of the screen board 1, and at least one edge of the connecting cloth 2 protrudes from a corresponding edge of the screen board 1. In addition, at least a portion of the second surface 12 of the screen board 1 located in the edge region 14 is connected to the connecting cloth 2.

In some examples, the connecting cloth 2 is a soft, high-strength, and inelastic or less elastic cloth. The connecting cloth 2 has characteristics of stable property and being able to adapt to a wide range of environments (e.g., maintaining good flatness and reliability in environment temperatures of −10° C. to 40° C.). For example, the connecting cloth 2 may be made of polyester, nylon, or polypropylene.

As described above, the screen board 1 is connected to the soft connecting cloth 2, and thus may be stretched with the deformation of the connecting cloth 2, so that the screen board 1 may be stretched to the flat state.

In some examples, a thickness of the connecting cloth 2 is in a range of 0.2 mm to 0.6 mm, such as 0.2 mm, 0.3 mm, 0.4 mm, 0.5 mm or 0.6 mm, or any thickness between any two of these values. In this way, a thickness of the entire projection screen may not be affected.

Figure 18:
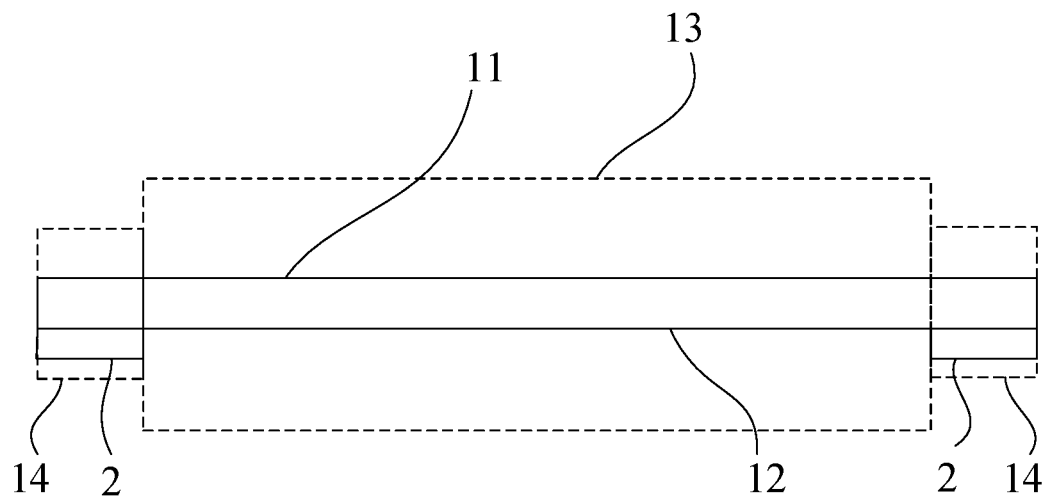
FIG. 18 is a side view of another screen board, in accordance with some embodiments.

In some examples, only the portion of the second surface 12 of the screen board 1 located in the edge region 14 is connected to the connecting cloth 2. For example, as shown in FIG. 18, the connecting cloth 2 is a whole piece of cloth with an opening in a center, and the opening is capable of exposing a portion of the second surface 12 of the screen board 1 located in the light receiving region 13. In this way, when the tension is applied to the connecting cloth 2, the portion of the second surface 12 of the screen board 1 located in the edge region 14 is subjected to the tension, and the portion of the second surface 12 of the screen board 1 located in the light receiving region 13 is also subjected to the tension, so that the entire screen board 1 may be stretched to the flat state.

Figure 19:
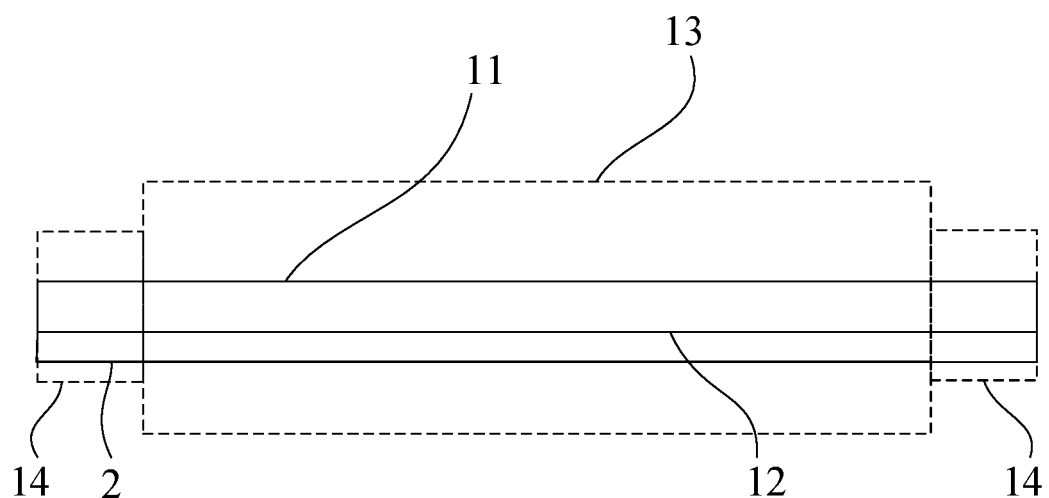
FIG. 19 is a side view of yet another screen board, in accordance with some embodiments.

In some other examples, as shown in FIG. 19, the connecting cloth 2 covers the entire second surface 12 of the screen board 1, and the entire second surface 12 of the screen board 1 is connected to the connecting cloth 2. In this way, when the connecting cloth 2 is subjected to the tension and is stretched to the flat state, the entire screen board 1 may also be stretched to the flat state.

In some embodiments, as shown in FIG. 8, the projection screen further includes an adhesive layer 15 between the connecting cloth 2 and the screen board 1, for connecting the connecting cloth 2 to the screen board 1. In this way, when the entire second surface 12 of the screen board 1 and the connecting cloth 2 are bonded, there may be no space between the entire second surface 12 of the screen board 1 and the connecting cloth 2. As a result, the displayed projection image may not be affected by air flow in the space (especially the air flow caused by temperature changes).

In some examples, the adhesive layer 15 may be an adhesive layer having a thermal expansion coefficient that is equal to or approximately equal to a thermal expansion coefficient of the entire screen board 1. In this way, when the screen board 1 expands or contracts due to temperature changes, the adhesive layer 15 may simultaneously expand or contract to a similar extent, which may be beneficial to maintain an effective bonding between the adhesive layer 15 and the screen board 1 to avoid separation of the adhesive layer 15 and the screen board 1, and may be beneficial to maintain the flatness of the screen board 1.

Alternatively, the adhesive layer 15 may be an adhesive layer having extensibility. In this way, when the screen board 1 expands or contracts due to temperature changes, the adhesive layer 15 may play a certain buffering role, which may be beneficial to maintain the flatness of the screen board 1, thereby reducing the influence on the projection image due to the deformation of the screen board 1 caused by the expansion and contraction.

In some embodiments, as shown in FIG. 8, the projection screen further includes a polyurethane (PU) layer 23 disposed between the connecting cloth 2 and the adhesive layer 15. The polyurethane layer 23 is located at least in a region where the connecting cloth 2 is connected to the screen board 1. Since a polyurethane material may be well attached to a surface of the connecting cloth 2, the polyurethane layer 23 may be well attached to the surface of the connecting cloth 2. In addition, the polyurethane layer 23 may increase surface energy of the connecting cloth 2, thereby improving the adhesion between the connecting cloth 2 and the adhesive layer 15.

In some examples, the connecting cloth 2 is made of the polyester, and the polyurethane layer 23 is sprayed on a surface of the connecting cloth 2 proximate to the screen board 1 (i.e., a surface of the connecting cloth 2 attached to the screen board 1).

In some other examples, the connecting cloth 2 and the screen board 1 are connected through a double-sided adhesive layer. Of course, other manners may also be used to realize the connection between the connecting cloth 2 and the screen board 1.

In some embodiments, a color of the connecting cloth 2 is black. In a case where the optical structure layers in the display panel 1 have a certain light transmittance (taking the hard screen as an example, the function of the reflective layer 104 is to reflect the projected light; however, since the reflectivity cannot reach 100%, a portion of the light may pass through the reflective layer 104, which may cause an image contrast to decrease), the black connecting cloth 2, which covers the second surface 12 of the screen board 1, may block the light. In this way, it may not only prevent the light leakage, but also prevent the second surface 12 of the screen board 1 from being scratched, thereby protecting the screen board 1.

Figure 3:
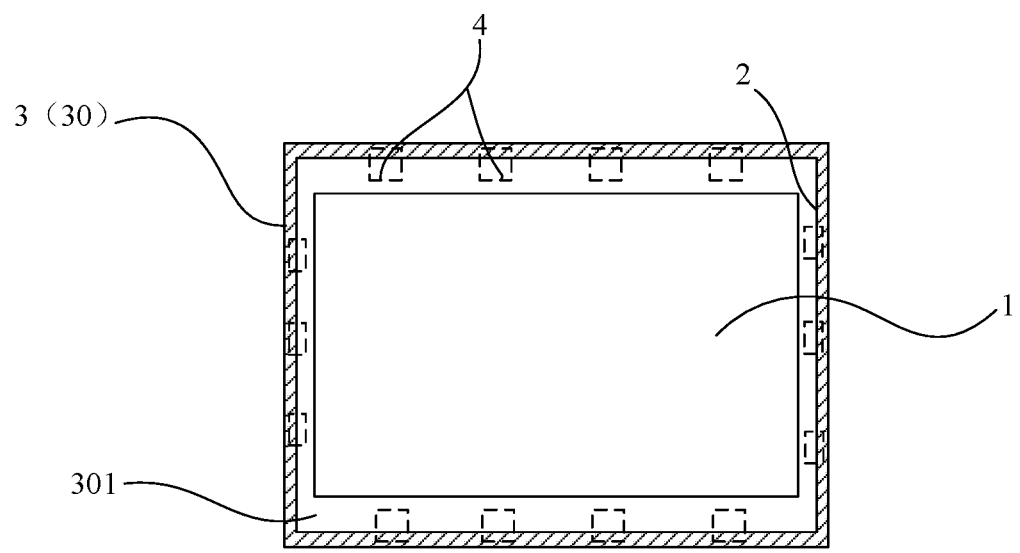
FIG. 3 is a front view of a projection screen, in accordance with some embodiments.

The screen frame 3 is connected to the connecting cloth 2 to fix the screen board 1. In some embodiments, as shown in FIGS. 3 and 7, the at least one connecting member includes a plurality of connecting members, all edges of the connecting cloth 2 are connected to the screen frame 3, and the at least one of the edges of the connecting cloth 2 protruding from the corresponding edge of the screen board 1 is connected to the screen frame 3 through at least one of the plurality of connecting members 4.

In some examples, as shown in FIG. 7, the screen frame 3 is of a hollow structure. In some examples, an orthographic projection of the screen board 1 on a plane parallel to the first surface 11 of the screen board 1 is located within an outer border of an orthographic projection of the screen frame 3 on the plane. The at least one connecting member 4 is configured to provide a tension to the connecting cloth 2, which may stretch the connecting cloth 2 and the screen board 1 to a flat state.

For example, the screen frame 3 is made of an aluminum-plastic material, but the embodiments of the present disclosure are not limited thereto.

Figure 5:
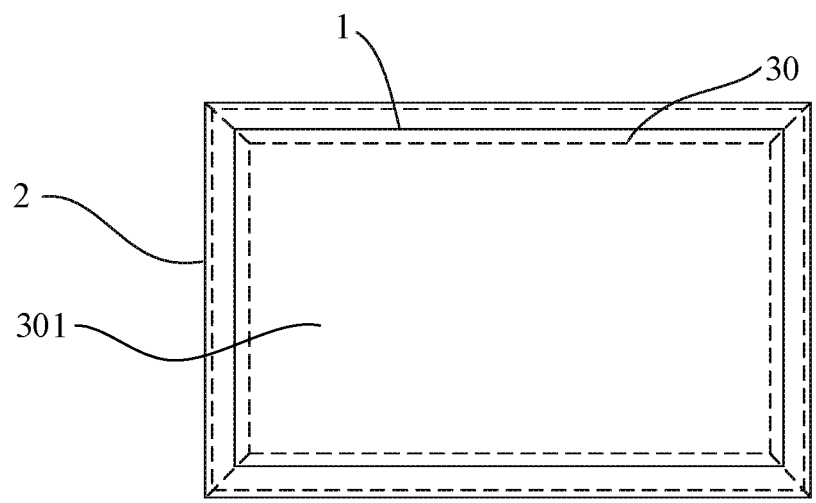
FIG. 5 is a front view of another projection screen, in accordance with some embodiments of the present disclosure.
Figure 6:
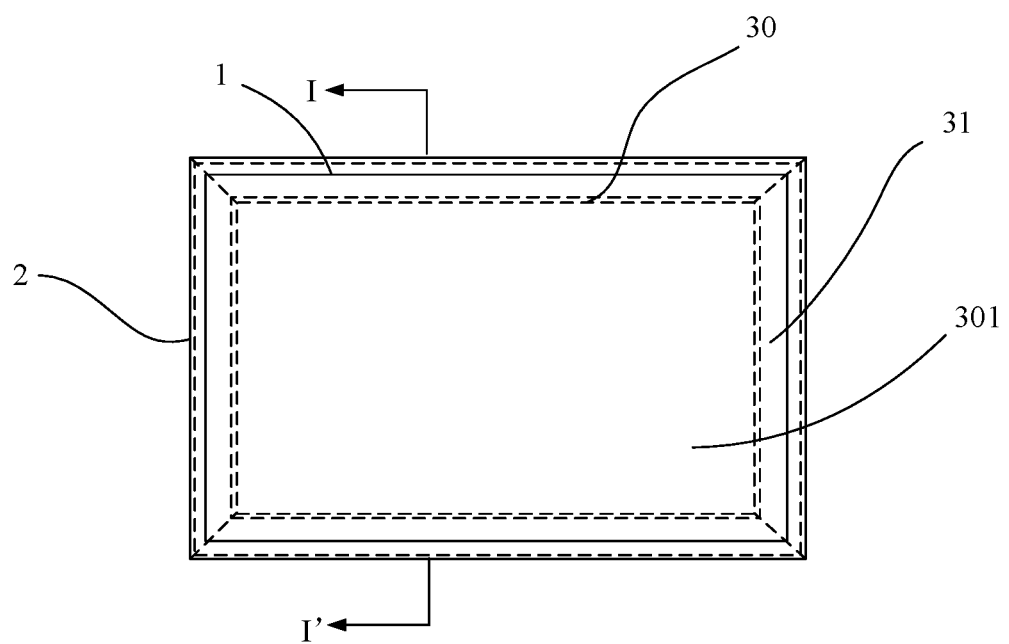
FIG. 6 is a front view of yet another projection screen, in accordance with some embodiments.

In some embodiments, as shown in FIGS. 5 and 6, the screen frame 3 includes a frame body 30 having a hollow region 301, and the connecting cloth 2 is connected to the frame body 30 at each side thereof.

In some examples, as shown in FIG. 3, the frame body 30 includes a plurality of beams that are integrally formed. That is, the frame body 30 is an integrated structure. In some other examples, as shown in FIGS. 5 and 6, the frame body 30 includes a plurality of beams (such as four beams) sequentially connected. For example, an angle between each end face of each beam and an extending direction of the beam is 45°. In this way, two adjacent end faces of two adjacent beams may be in direct contact with each other, so that the two adjacent beams are connected with an angle of 90° therebetween. For example, two adjacent end faces of two adjacent beams are fixed by welding.

The shape of the frame body 30 may be adapted to the shape of the screen board 1. For example, the screen board 1 is in a shape of a rectangle, and the frame body 30 is in a shape of a rectangular ring. However, the embodiments of the present disclosure are not limited thereto, and the shape of the frame body 30 may also have other shapes, such as a polygonal ring. In addition, the hollow region 301 may be in a shape of a rectangle, but the embodiments of the present disclosure are not limited thereto.

Figure 9:
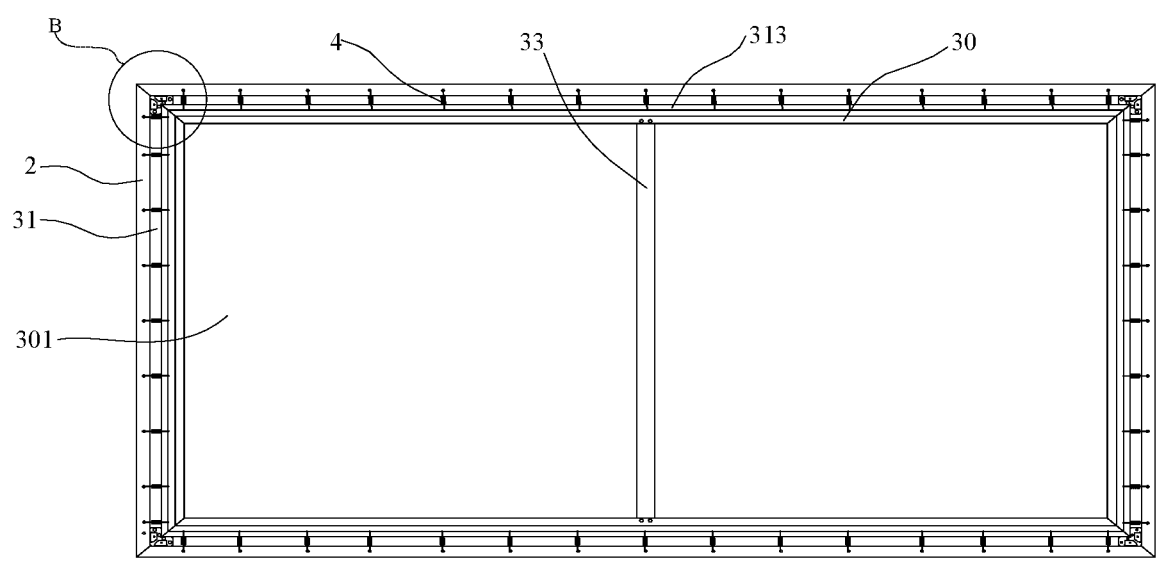
FIG. 9 is a rear view of a projection screen, in accordance with some embodiments.
Figure 13:
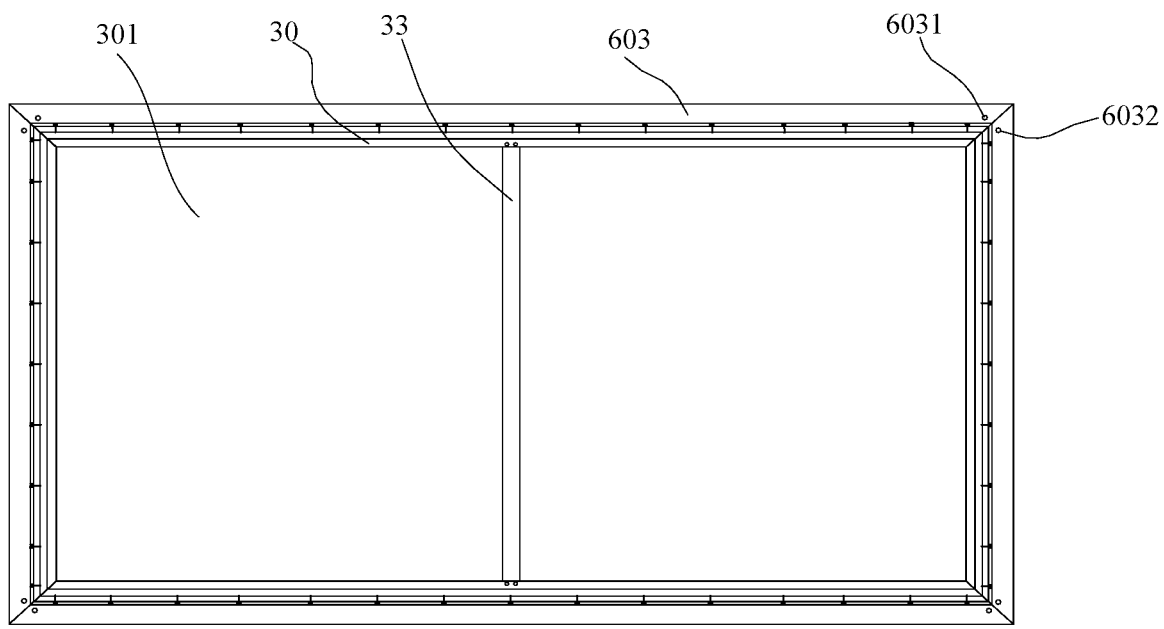
FIG. 13 is a rear view of a projection screen mounted with a decorative frame, in accordance with some embodiments.

In some examples, as shown in FIGS. 9 and 13, the screen frame 3 further includes at least one first reinforcing beam 33 that spans across the hollow region 301 and is fixed to the frame body 30, so as to improve the structural strength of the entire screen frame 3. For example, each first reinforcing beam 33 is arranged across the hollow region 301, and two ends of the first reinforcing beam 33 are fixed to two opposite beams of the screen frame 3.

Figure 11:
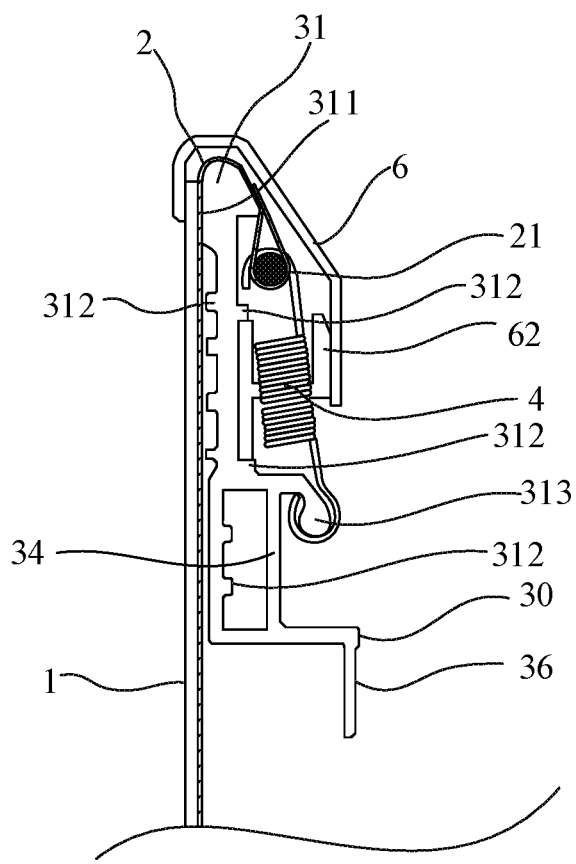
FIG. 11 is a partially cross-sectional view of a projection screen mounted with a decorative frame, in accordance with some embodiments.
Figure 12:
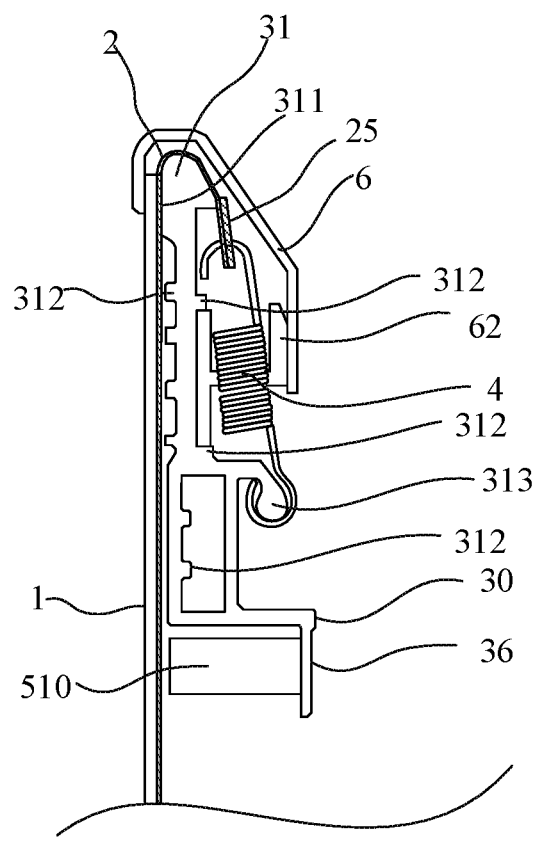
FIG. 12 is a partially cross-sectional view of another projection screen mounted with a decorative frame, in accordance with some embodiments.

In some example, as shown in FIGS. 7, 11 and 12, the beam included in the frame body 30 is of a frame structure. For example, as shown in FIG. 7, the beam has a section in a shape of a rectangular ring. In another example, as shown in FIGS. 11 and 12, the beam has a U-shaped section.

In some examples, as shown in FIGS. 7, 11 and 12, the screen frame 3 further includes at least one second reinforcing beam 34 connected to each beam included in the frame body 30, so as to improve the structural rigidity of the entire screen frame 3. For example, as shown in FIGS. 7, 11 and 12, the second reinforcing beam 34 is fixed to two opposite sides of the beam, e.g., the upper side and the lower side of the beam shown in FIG. 7.

For example, as shown in FIG. 7, the screen frame 3 further includes a reinforcing rib 35 connected to each beam. The reinforcing rib 35 is of a column structure in a shape of a triangular ring, and extends in an extending direction of the beam.

As described above, the projection screen includes at least one connecting member 4. In some examples, the connecting member 4 may be a spring, a rubber member, an elastic silica gel member, or a magnetic adsorption member.

For example, the connecting member 4 is the spring, the rubber member or the elastic silica gel member, one end of the connecting member 4 is connected to an edge of the connecting cloth 2, and another end thereof is connected to the screen frame 3. In this way, an elasticity of the connecting member 4 itself may be used to provide a tension to the connecting cloth 2.

For another example, the connecting member 4 is the magnetic adsorption member, and the magnetic adsorption member includes a pair of magnets. One of the magnets is bonded to the screen frame 3, and another magnet is provided at a corresponding edge of the connecting cloth 2. In this way, a tension may be provided to the connecting cloth 2 through mutual attraction between the two magnets.

In some examples, in order to arrange the another magnet at the edge of the connecting cloth 2, the edge of the connecting cloth 2 protruding from the screen board 1 is curled to form a cavity for accommodating the another magnet. In this way, the another magnet is enclosed in the cavity.

For example, the edge of the connecting cloth 2 is curled in a direction facing away from the screen board 1 or a direction facing the screen board 1, and the edge of the connecting cloth 2 is stitched to another portion of the connecting cloth 2. In this way, the edge of the connecting cloth 2 may form the cavity that can accommodate the another magnet.

Of course, other manners may also be used to make the another magnet set at the edge of the connecting cloth 2, and the embodiments of the present disclosure are not limited thereto. For example, it may also be that after the another magnet is placed in the cavity, the edge of the connecting cloth 2 is stitched to another portion of the connecting cloth 2 to form a closed cavity. It will be noted that, after the another magnet is placed in the cavity, even if there is the mutual attraction between the two magnets, the another magnet will not leave the cavity.

Since the connecting cloth 2 and the screen board 1 are bonded together, when the at least one connecting member 4 provides the tension to the connecting cloth 2 to stretch the connecting cloth 2 to the flat state, the screen board 1 may also be subjected to the tension so as to be stretched to the flat state. As a result, the screen board 1 may meet the flatness requirement required for display, the projection image may have a better display effect, and the projection image may be prevented from being skewed and deformed.

It will be noted that, when the elastic connecting member 4, such as the spring, the rubber member, or the elastic silica gel member, stretches the screen board 1, it is necessary to ensure that the at least one elastic connecting member 4 has sufficient tensile strength, so as to ensure that the screen board 1 is effectively stretched and maintains a good flatness. In addition, when the magnetic connecting member 4, such as the magnetic adsorption member, stretches the screen board 1, it is necessary for two adsorption members (such as magnets) of the magnetic connecting member 4 to have sufficient adsorption force, so as to ensure that the screen board 1 is effectively stretched and maintains a good flatness.

In an example where the connecting member 4 is the spring, a size of the screen board 1 is 80 inches, and a weight of the screen board 1 is approximately 5 kg (a weight of the connecting cloth 2 is low, and may be omitted), an effective number of coils of the spring may be designed to be 6, and a free length is approximately 23 mm. In this way, when the spring stretches the screen board 1, a stretched length of the spring is approximately 30 mm. That is, an elongation of the spring is approximately 7 mm.

In some examples, an edge of the connecting cloth 2 protrudes from a corresponding edge of the screen board 1, and the edge is connected to the screen frame 3 through the at least one connecting member 4. Other edges of the connecting cloth 2 are connected to the screen frame 3 through, for example, an adhesive.

By arranging the at least one connecting member 4 at only one edge of the connecting cloth 2, another edge of the connecting cloth 2 opposite to the edge may be stretched under the action of the tension of the at least one connecting member 4.

In some other examples, the at least one connecting member includes a plurality of connecting members, two edges of the connecting cloth 2 protrude from corresponding edges of the screen board 1, and each of the two edges is connected to the screen frame 3 through at least one of the plurality of connecting members 4.

For example, two adjacent edges of the connecting cloth 2 protrude from corresponding edges of the screen board 1, and each of the two edges is connected to the screen frame 3 through at least one of the plurality of connecting members 4.

For example, the connecting cloth 2 having a rectangular shape includes opposite upper and lower edges, and opposite left and right edges. One of the upper and lower edges is connected to the screen frame 3 through at least one of the plurality of connecting members 4, and another one is connected to the screen frame 3 through the adhesive. One of the left and right edges is connected to the screen frame 3 through at least one of the plurality of connecting members 4, and another one is connected to the screen frame 3 through the adhesive. In this way, as for two opposite edges (the upper edge and the lower edge, or the left edge and the right edge) of the screen board 1, a tension direction of the at least one of the plurality of connecting members 4 is parallel to a line connecting the two opposite edges. Therefore, by arranging the at least one of the plurality of connecting members 4 at one of the two opposite edges, another one of the two opposite edges may also be subjected to the tension. As a result, the screen board 1 may be stretched to the flat state under the action of the tension provided by the at least one of the plurality of connecting members 4.

For another example, two opposite edges of the connecting cloth 2 protrude from corresponding edges of the screen board 1, and each of the two opposite edges is connected to the screen frame 3 through at least one of the plurality of connecting members 4.

For example, the connecting cloth 2 having a rectangular shape includes the opposite upper and lower edges, and the opposite left and right edges. Each of the upper and lower edges is connected to the screen frame 3 through at least one of the plurality of connecting members 4, and each of the left and right edges is connected to the screen frame 3 through the adhesive.

In some embodiments, the upper edge and the lower edge of the connecting cloth 2 protrude from the corresponding edges of the screen board 1, and each of the upper edge and the lower edge is connected to the screen frame 3 through at least one of the plurality of connecting members 4. In this way, the upper and lower sides of the screen board 1 are stretched by the connecting cloth 2. That is, the upper and lower sides of the screen board 1 are stretched and fixed. As a result, the upper and lower sides may be prevented from curling due to insufficient fixing force. In addition, since a length of the screen board 1 in a horizontal direction is generally greater than its width in a vertical direction, the tension of the connecting cloth 2 to the upper and lower sides of the screen board 1 may also prevent the left and right sides from curling.

In yet some other examples, the at least one connecting member includes a plurality of connecting members, three edges of the connecting cloth 2 protrude from corresponding edges of the screen board 1, and each of the three edges is connected to the screen frame 3 through at least one of the plurality of connecting members 4.

For example, the connecting cloth 2 having a rectangular shape includes the opposite upper and lower edges, and the opposite left and right edges. Each of the upper edge, the lower edge, and the left edge is connected to the screen frame 3 through at least one of the plurality of connecting members 4, and the right edge is connected to the screen frame 3 through the adhesive. For another example, each of the upper edge, the left edge, and the right edge is connected to the screen frame 3 through at least one of the plurality of connecting members 4, and the lower edge is connected to the screen frame 3 through the adhesive.

In this way, at least one of the plurality of connecting members 4 is disposed at one of the two opposite edges of the connecting cloth 2, and another edge of the connecting cloth 2 opposite to the edge may also be stretched under the action of the tension of the at least one of the plurality of connecting members 4. Therefore, four sides of the screen board 1 may be stretched, and the screen board 1 may be stretched to the flat state under the action of the tension provided by the at least one of the plurality of connecting members 4.

In yet some other examples, as shown in FIGS. 3, 5, and 6, the at least one connecting member includes a plurality of connecting members, all edges of the connecting cloth 2 protrude from corresponding edges of the screen board 1. As shown in FIGS. 3 and 9, each edge of the connecting cloth 2 is connected to the screen frame 3 through at least one of the plurality of connecting members 4. In this way, the entire screen board 1 may have better flatness in all directions.

For example, the connecting cloth 2 includes the opposite upper and lower edges, and the opposite left and right edges. The at least one of the plurality of connecting members connected to each of the upper edge, the lower edge, the left edge, and the right edge includes multiple connecting members, and the edge is connected to the screen frame 3 through the multiple connecting members 4 that are equally spaced. In this way, upper, lower, left, and right sides of the screen board 1 may be subjected to the tension of the connecting members 4. As a result, the screen board 1 may be effectively stretched in all directions, and maintain the flat state.

For another example, the connecting members 4 are disposed around the screen board 1, and densities of connecting members 4 disposed on the left and right edges of the screen board 1 are less than densities of connecting members 4 disposed on the upper and lower edges of the screen board 1. Since the screen board 1 is vertically suspended when used, the upper and lower sides of the screen board 1 may not be easy to curl, but the left and right sides of the screen board 1 may be easy to curl. Therefore, the upper and lower sides of the screen board 1 need to receive greater tension relative to the left and right sides of the screen board 1 to effectively resist gravity of the screen board 1 and the stress that causes the left and right sides of the screen board 1 to curl. Since the connecting members 4 disposed on the upper and lower edges of the screen board 1 are dense, while the connecting members 4 disposed on the left and right edges of the screen board 1 are relatively sparse, the upper and lower sides of the screen board 1 are subjected to greater tension. Such arrangement manners of the connecting members 4 may apply appropriate tension to sides of the screen board 1 in accordance with stretching requirements of different sides of the screen board 1, which may achieve better stretching and fixing effects.

It will be noted that, the arrangement manners of the at least one connecting member 4 are not only suitable for connecting the connecting cloth 2 to the portion of the second surface 12 of the screen board 1 located in the edge region 14, but also for connecting the connecting cloth 2 to the entire second surface 12 of the screen board 1.

In some embodiments, as shown in FIGS. 3 and 9, the at least one of the plurality of connecting members connected to each edge of the connecting cloth includes multiple connecting members, and the edge of the connecting cloth 2 protruding from a corresponding edge of the screen board 1 is connected to the screen frame 3 through multiple connecting members 4. For example, the multiple connecting members 4 located on the edge of the connecting cloth 2 are equally spaced in an extending direction of a side of the screen board 1 corresponding to the edge, so that the edge of the connecting cloth 2 may be uniformly stressed.

In this way, the screen board 1 and the connecting cloth 2 may be stretched to the flat state effectively. The multiple connecting members 4 may have a suitable arrangement density. In this way, the multiple connecting members 4 spaced apart may be used to provide sufficient tension to the screen board 1; in addition, a moderate number of connecting members 4 may avoid a tedious installation process.

For example, a distance between every two adjacent connecting members 4 at a same edge of the connecting cloth 2 is approximately 134 mm. In this way, the edges of the connecting cloth 2 may be uniformly stressed to ensure that the screen board 1 has the flatness required for display.

In some embodiments, the projection screen further includes at least one first reinforcing structure. Each first reinforcing structure is capable of being in direct contact with an edge of the connecting cloth 2 that protrudes from a corresponding edge of the screen board 1. The first reinforcing structure is configured to reinforce a structure of the edge, so as to avoid tearing and deforming the edge when the connecting cloth 2 is connected to the at least one of the plurality of connecting members 4.

Figure 14:
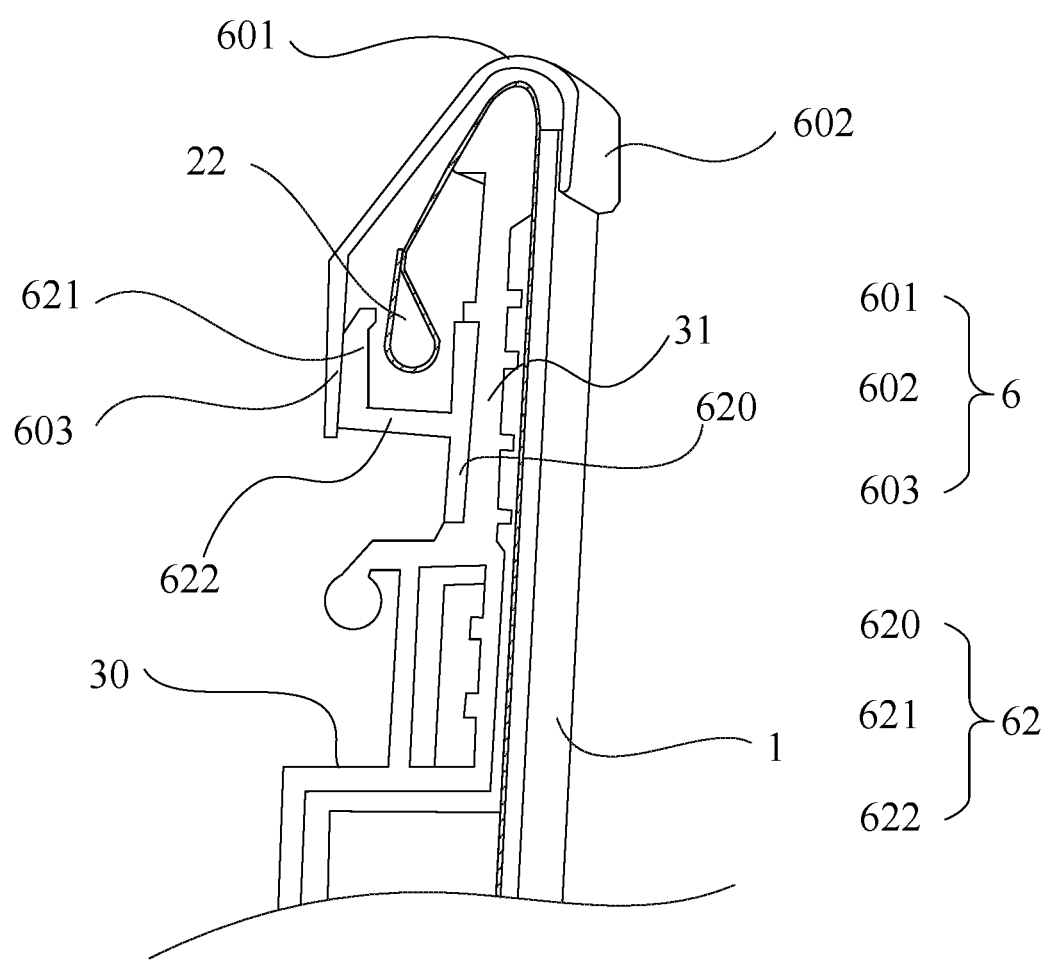
FIG. 14 is a schematic diagram showing a connection between a decorative frame and a screen frame of a projection screen, in accordance with some embodiments.

In some examples, as shown in FIGS. 7 and 11, the first reinforcing structure is a rod member 21. The rod member 21 is made of, for example, a lightweight metal material such as aluminum alloy or magnesium alloy. In order to connect the connecting cloth 2 to the rod member 21, as shown in FIG. 14, each edge of the connecting cloth 2 protruding from the corresponding edge of the screen board 1 is curled to form a through hole 22 for allowing the rod member 21 to pass through, and the through hole 22 extends in an extending direction of a side of the screen board 1 corresponding to the edge. For example, the through hole 22 is formed by stitching. The rod member 21 is placed in the through hole 22.

The rod member 21 may have various shapes. For example, the rod member 21 is in a shape of a straight rod. Accordingly, an edge of the connecting cloth 2 may be curled in a direction away from the screen board 1 or in a direction facing the screen board 1, and the edge of the connecting cloth 2 is stitched to another portion of the connecting cloth 2. In this way, the edge of the connecting cloth 2 may form the through hole 22 to allow the rod member 21 to pass through.

It will be noted that, after the rod member 21 is inserted into the through hole 22, the rod member 21 is subjected to tension under the action of the at least one connecting member 4. As a result, the rod member 21 may not leave the through hole 22. Alternatively, after the rod member 21 is inserted into the through hole 22, the portions of the connecting cloth 2 corresponding to two ends of the through hole 22 may be stitched, respectively, so that the rod member 21 is located in a closed space.

Figure 10:
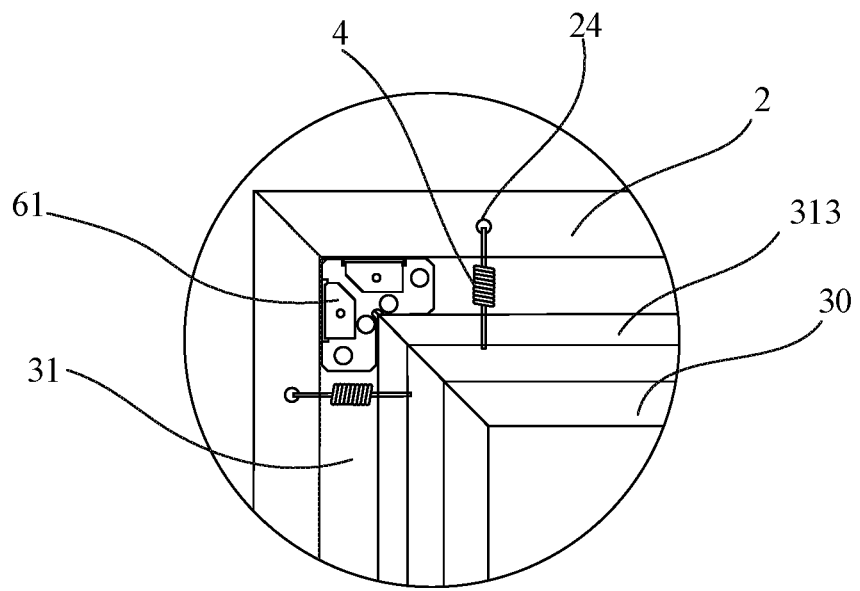
FIG. 10 is an enlarged diagram of region B in FIG. 9.

As shown in FIGS. 10 and 11, in order to connect the at least one connecting member 4 to the rod member 21, the edge of the connecting cloth 2 is provided with at least one group of openings 24. Each group of openings 24 includes at least one opening 24, and corresponds to one connecting member 4. In this way, a portion of the connecting member 4 may be connected to the rod member 21 through a corresponding group of openings 24.

For example, the connecting member 4 is a pull spring (also called an extension spring). One end of the pull spring is a hook, and each group of openings includes an opening 24. The hook of the pull spring passes through the opening 24, enters the through hole 22 and is connected to the rod member 21 in a suspension manner. Another end of the pull spring is connected to the screen frame 3.

For another example, as shown in FIGS. 7, 10 and 11, the connecting member 4 is a pull spring, and one end of the pull spring is a hook. Each group of openings 24 includes two openings 24, and the two openings 24 are provided in portions of the edge of the connecting cloth 2 that overlap each other, respectively. The hook of the pull spring passes through the two openings 24 and is connected to a portion of the connecting cloth 2 covering the rod member 21 in a suspension manner.

For another example, the connecting member 4 is a rubber member or an elastic silica gel member, and each group of openings 24 includes one opening 24. One end of the rubber member or the elastic silica gel member passes through the opening 24 and is connected to the rod member 21 by riveting.

For another example, the connecting member 4 is a magnetic adsorption member, the magnetic adsorption member includes a pair of magnets, and each group of openings 24 includes one opening 24. In this case, the magnet disposed at the edge of the connecting cloth 2 passes through the opening 24 to be adhered to the rod member 21.

In this way, when the rod member 21 moves under the tension provided by the at least one connecting member 4, the connecting cloth 2 may also be stretched to the flat state. Since the connecting cloth 2 may be connected to the at least one connecting member 4 through the rod member 21, the rod member 21 may be used to carry the force, and to homogenize the tension provided by the at least one connecting member 4 on the edge of the connecting cloth 2. In this case, edges of the connecting cloth 2 are not easily torn or damaged. In addition, the connecting cloth 2 may also apply a uniform tension to the screen board 1, which may be beneficial to improve the flatness of the screen board 1.

In addition, the tension provided by the at least one connecting member 4 may be evenly transmitted to the edge of the connecting cloth 2 through the rod member 21. Therefore, if the at least one connecting member 4 can provide sufficient tension, the edge of the connecting cloth 2 provided with the rod member 21 may be connected to the screen frame 3 through only one connecting member 4. Of course, the edge of the connecting cloth 2 provided with the rod member 21 may also be connected to the rod member 21 through multiple connecting members 4. For example, the rod member 21 is a straight rod, which may be connected to the multiple connecting members 4, and the multiple connecting members 4 spaced apart are connected to different rod sections of the straight rod.

For example, as shown in FIG. 14, each edge of the connecting cloth 2 protruding from the edge of the screen board 1 is bent in a direction away from the screen board 1. The edge of the connecting cloth 2 wraps a corresponding outer edge of the screen frame 3, and a portion of the edge of the connecting cloth 2 located at a side of the screen frame 3 away from the screen board 1 is curled to form the through hole 22. In this case, as shown in FIG. 11, the at least one of the plurality of connecting members 4 is also disposed at the side of the screen frame 3 away from the screen board 1. That is, the through hole 22, the rod member 21 located in the through hole 22 and the at least one of the plurality of connecting members 4 are all located at the side of the screen frame 3 away from the screen board 1.

In some other examples, as shown in FIG. 12, the first reinforcing structure is a thickening cloth layer 25. The thickening cloth layer 25 is made of polyester. For example, the thickening cloth layer 25 is of a multilayer structure (for example, includes two layers, three layers, or four layers) formed by bending and stitching the edge of the connecting cloth 2. For another example, the thickening cloth layer 25 is connected to the edge of the connecting cloth 2 by stitching or bonding, and a thickness of the thickening cloth layer 25 is greater than a thickness of the connecting cloth 2. In this way, strength of the edge of the connecting cloth 2 may be ensured through the thickening cloth layer 25.

For example, the thickness of the connecting cloth 2 is in a range of 0.2 mm to 0.6 mm, such as 0.2 mm, 0.3 mm, 0.4 mm, 0.5 mm or 0.6 mm, or any thickness between any two of these values. For example, the thickness of the thickening cloth layer is in a range of 0.4 mm to 2.4 mm, such as 0.4 mm, 1.0 mm, 1.5 mm, 2.0 mm, or 2.4 mm, or any thickness between any two of these values.

In this case, for example, as shown in FIG. 12, the connecting member 4 is the pull spring, the edge of the connecting cloth 2 is provided with the at least one opening 24, and the at least one opening 24 penetrates the thickening cloth layer 25. In this way, the hook of the pull spring passes through the opening 24 and is connected to the edge of the connecting cloth 2 in a suspension manner. For another example, the connecting member 4 is the rubber member or the elastic silica gel member, and the edge of the connecting cloth 2 is connected to the rubber member or the elastic silica gel member by riveting.

In a case where the at least one connecting member 4 is connected to the screen frame 3, since the at least one connecting member 4 and the screen frame 3 are rigid structures, the connection between the at least one connecting member 4 and the screen frame 3 may be realized through a fixing manner such as clamping, threaded connection or riveting.

In some embodiments, the screen frame 3 further includes at least one connecting structure connected to the frame body 30 for connecting the screen frame 3 to the connecting member 4.

In some examples, as shown in FIGS. 7, 11 and 12, the connecting member 4 is a pull spring, and an end of the pull spring connected to the screen frame 3 is a hook. The connecting structure 313 is connected to the frame body 30. For example, the connecting structure 313 is disposed on a surface of a support portion 31 (described below) away from the screen board 1 (as shown in FIG. 7). For another example, the connecting structure 313 is disposed on a side of the frame body 30 away from the screen board 1 (as shown in FIGS. 11 and 12).

The connecting structure 313 may have different structures. For example, as shown in FIG. 7, a cross-section of the connecting structure 313 may be L-shaped. That is, the connecting structure 313 is an L-shaped hook to cooperate with the hook of the pull spring. For another example, as shown in FIGS. 11 and 12, a size of an end portion of the connecting structure 313 connected to the pull spring is greater than a size of a root portion of the connecting structure 313 connected to the frame body 30. A size of a gape of the hook is slightly greater than the size of the root portion of the connecting structure 313, and is smaller than the size of the end portion of the connecting structure 313.

As shown in FIGS. 11 and 12, when the hook of the pull spring is connected to the connecting structure 313, since the size of the end portion of the connecting structure 313 is large, and the size of the gape of the hook is small, the hook of the pull spring wraps the end portion of the connecting structure 313. The end portion of the connecting structure 313 may limit the pull spring in a tension direction, so that the pull spring will not be separated from the connecting structure 313 when being stretched, which may ensure the reliability of the connection.

In some examples, a bottom face of the end portion of the connecting structure 313 away from the root portion is an arc face, so that the end portion of the connecting structure 313 matches with a bent portion of the hook of the pull spring. For example, the end portion of the connecting structure 313 is in a shape of a sphere, and the hook of the pull spring is in a shape of a circular arc.

In the embodiments of the present disclosure, there may be different arrangement manners among the screen board 1, the connecting cloth 2, and the screen frame 3.

In a first possible implementation, as shown in FIG. 3, an orthographic projection of the screen board 1 on a plane parallel to the second surface 12 of the screen board 1 does not overlap with an orthographic projection of the frame body 30 on the plane. That is, the orthographic projection of the screen board 1 on the plane is located within an orthographic projection of the hollow region 301 of the frame body 30 on the plane. In this case, all the edges of the connecting cloth 2 protrude from the corresponding edges of the screen board 1.

In this case, as shown in FIG. 3, a size of the hollow region 301 of the frame body 30 is greater than the size of the screen board 1, and the screen board 1 may be placed in the hollow region 301, so that the frame body 30 may surround the edges of the screen board 1 to protect the screen board 1.

Herein, the relative sizes of the connecting cloth 2 and the hollow region 301 are not limited. For example, as shown in FIG. 3, the size of the hollow region 301 is equal to the size of the connecting cloth 2. Of course, the size of the hollow region 301 may also be greater than the size of the connecting cloth 2. In this case, one end of the connecting member 4 is connected to the edge of the connecting cloth 2, and another end of the connecting member 4 protrudes from the edge of the connecting cloth 2 and is connected to the screen frame 3 outside the connecting cloth 2. In this way, the connecting cloth 2 may be fixed in a center of the screen frame 3 through the connecting member 4, and the connecting cloth 2 may be stretched through the tension provided by the connecting member 4, so that the connecting cloth 2 may be stretched to the flat state.

For another example, the size of the connecting cloth 2 is greater than the size of the hollow region 301. In this case, the connecting cloth 2 may cover a surface of the entire screen frame 3 facing the screen board 1, and each edge of the connecting cloth 2 is bent in the direction away from the screen board 1 to wrap the corresponding outer edge of the screen frame 3 and is connected to the screen frame 3 through the connecting member 4. As described above, the connecting cloth 2 may be fixed on the screen frame 3 through the connecting member 4, and the connecting cloth 2 may be stretched to the flat state through the tension provided by the connecting member 4.

In a second possible implementation, as shown in FIG. 5, an outer border of the orthographic projection of the screen board 1 on the plane parallel to the second surface 12 of the screen board 1 is located within the orthographic projection of the screen frame 3 on the plane. That is, the orthographic projections of the edges of the screen board 1 on the plane are located between orthographic projections of outer edges of the frame body 30 on the plane and orthographic projections of inner edges of the screen frame 3 on the plane, respectively.

In a third possible implementation, the outer border of the orthographic projection of the screen board 1 on the plane coincide with the orthographic projection of the screen frame 3 on the plane. That is, the edges of the screen board 1 are flush with the outer edges of the screen frame 3.

In the second and third implementations, the screen frame 3 is disposed at a side of the screen board 1 away from the first surface 11, and the size of the screen board 1 is greater than the size of the hollow region 301. In this way, a portion of the screen frame 3 overlapping with the screen board 1 may support the screen board 1. In addition, in these two implementations, each edge of the connecting cloth 2 may be bent in the direction away from the screen board 1 to wrap the corresponding outer edge of the screen frame 3, and may be connected to the screen frame 3 through the connecting member 4.

In some embodiments, as shown in FIGS. 6 and 7, the screen frame 3 further includes a plurality of support portions 31. Each support portions 31 is directly connected to a corresponding side face of the frame body 30 facing away from the light receiving region. An outer border of the orthographic projection of the screen board 1 on the plane parallel to the second surface 12 of the screen board 1 is located within an outer border of orthographic projections of the plurality of support portions 31 on the plane. Edges of the plurality of support portions 31 away from the frame body 30 are the outer edges of the screen frame 3. For example, the plurality of support portions 31 and the frame body 30 are an integrated structure. That is, the plurality of support portions 31 and the frame body 30 are integrally formed.

The edges of the plurality of support portions 31 of the screen frame 3 away from the frame body 30 may be set to protrude from the edges of the screen board 1, respectively. In this way, if the screen board 1 expands and contracts due to external temperature changes, bumps and other phenomena may not occur between the edges of the screen board 1 and the outer edges of the screen frame 3.

It will be noted that, FIG. 7 is a schematic diagram shown by taking the structures of the upper and lower sides of the projection screen as an example, and FIGS. 11 and 12 are schematic diagrams shown by taking the structure of the upper side of the projection screen as an example. It will be understood that, structures of the left and right sides of the projection screen may be similar to the structures of the upper and lower sides of the projection screen, which will not be described herein again.

In some examples, as shown in FIGS. 7, 11, and 12, at least a portion of a surface of the support portion 31 proximate to the screen board 1 is a support surface 311. The support surface 311 is parallel to a plane where the second surface 12 of the screen board 1 is located, and the support surface 311 at least supports the edge portions of the second surface 12 of the screen board 1. For example, the support surface 311 supports at least a portion of the second surface 12 of the screen board 1 located in the edge region 14. Of course, an entire surface of the support portion 31 proximate to the screen board 1 may be the support surface 311. In some examples, the support portion 31 is of a plate-shaped structure, but is not limited thereto.

Since the screen frame 3 is of a rigid structure with relatively high hardness, the support portion 31 may achieve good contact support for the second surface 12 of the screen board 1.

For example, as for each edge of the connecting cloth 2 protruding from the corresponding edge of the screen board 1, the edge of the connecting cloth 2 is bent toward the second surface 12 of the screen board 1, so that the edge wraps an edge of a corresponding support portion 31 away from the frame body 30 and extends to a surface of the screen frame 3 facing away from the screen board 1. In addition, the portion of the edge extending to the surface of the screen frame 3 facing away from the screen board 1 is connected to the screen frame 3 through the connecting member 4.

In this way, the edge of the support portion 31 away from the frame body 30 may be used as a supporting point to support the connecting cloth 2. In this case, the edge of the support portion 31 away from the frame body 30 may be equivalent to a fixed pulley, and the connecting cloth 2 may move in two different directions depending on the support of the support portion 31. When the connecting member 4 applies a tension on a portion of the edge of the connecting cloth 2 that is located at a side of the support portion 31 away from the screen board 1 so as to make it extend in a direction proximate to the frame body 30, a portion of the edge of the connecting cloth 2 that is located at the side of the support portion 31 proximate to the screen board 1 may be reversely stretched to extend in a direction away from the frame body 30. As a result, the connecting cloth 2 and the screen board 1 bonded with the connecting cloth 2 may extend simultaneously.

Since the support portion 31 can change a direction of the force to which the connecting cloth 2 is subjected, the connecting member 4 may be disposed at the side of the screen frame 3 away from the screen board 1. That is, the connecting member 4 may be hidden on the side of the second surface 12 of the screen board 1. In this way, the connecting member 4 will be shielded by the screen board 1 and the connecting cloth 2, and is not easily seen from the first surface 11 of the projection screen 1. In thus arrangement manner, there is no connecting member 4 at the edge of the screen board 1. As a result, it may be avoided that the dimensions of the screen frame 3 in a length direction and a width direction of the screen board 1 are increased due to the connecting member 4, which may make the dimensions of the screen frame 3 in the length direction and the width direction of the screen board 1 be small, and effectively improve the appearance and display effect of the projection screen.

That the connecting member 4 is disposed at the side of the screen frame 3 away from the screen board 1 may be that, the connecting member 4 is disposed at a side of the support portion 31 away from the screen board 1, or the connecting member 4 is disposed at a side of the frame body 30 away from the screen board 1.

For example, as shown in FIGS. 7, 11 and 12, a maximum thickness of the support portion 31 is less than a maximum thickness of the frame body 30, and the connecting member 4 is disposed at the side of the support portion 31 away from the screen board 1. The maximum thickness of the support portion 31 refers to a maximum dimension of the entire support portion 31 in the direction perpendicular to the second surface 12 of the screen board 1. The maximum thickness of the frame body 30 refers to a maximum dimension of the entire frame body 30 in the direction perpendicular to the second surface 12 of the screen board 1.

In this way, by arranging the connecting member 4 at the side of the support portion 31 away from the screen board 1, the thickness of the entire projection screen may not be increased.

In some examples, as shown in FIGS. 11 and 12, in a case where the connecting structure 313 is connected to the frame body 30, a portion of the frame body 30 away from the screen board 1 may be removed to form a space capable of accommodating the connecting structure 313, thereby avoiding increasing the thickness of the entire projection screen. The thickness of the entire projection screen refers to a maximum dimension of the projection screen in the direction perpendicular to the second surface 12 of the screen board 1.

In some embodiments, as shown in FIGS. 11 and 12, the screen frame 3 further includes a plurality of protrusions 312 disposed on a surface of the support portion 31 that is proximate to the screen board 1 and/or away from the screen board 1, so as to enhance the rigidity of the support portion 31.

In some examples, as shown in FIG. 11, a portion of the surface of the support portion 31 proximate to the screen board 1 is the support surface 311. The plurality of protrusions 312 are disposed on the surface of the support portion 31 proximate to the screen board 1, and the plurality of protrusions 312 are located between the support surface 311 and the frame body 30.

For example, surfaces of the plurality of protrusions 312 proximate to the screen board 1 are parallel to a plane where the second surface 12 of the screen board 1 is located, and surfaces of at least part of the protrusions 312 proximate to the connecting cloth 2 are in direct contact with the connecting cloth 2, so as to increase a contact area between the support portion 31 and the connecting cloth 2, so that the protrusions 312 may support the second surface 12 of the screen board 1 and the rigidity of the support portion 31 may be improved.

For example, heights of the plurality of protrusions 312 are the same. The height of the protrusion 312 refers to a dimension of the protrusion 312 in a direction perpendicular to the second surface 12 of the screen board 1. In this way, the support surface 311 and the plurality of protrusions 312 may form a good planar support for the screen board 1. Furthermore, the arrangement of the plurality of protrusions 312 may not only strengthen the structure of the support portion 31 but also increase the support area for the screen board 1.

In some other examples, the entire surface of the support portion 31 proximate to the screen board 1 is the support surface 311, and the plurality of protrusions 312 are disposed on the surface of the support portion 31 facing away from the screen board 1. In this way, the contact area between the support portion 31 and the connecting cloth 2 may be increased to strengthen the support effect.

In yet some other examples, as shown in FIGS. 11 and 12, the plurality of protrusions 312 are disposed not only on the surface of the support portion 31 proximate to the connecting cloth 2, but also on the surface of the support portion 31 away from the connecting cloth 2.

For example, the surface of the frame body 30 proximate to the connecting cloth 2 may be set to be parallel to the second surface 12 of the screen board 1, and be in direct contact with the surface of the connecting cloth 2 away from the screen board 1, so as to further increase the contact area between the screen frame 3 and the connecting cloth 2. As a result, the support for the screen board 1 may be further strengthened, and the screen board 1 may have a good flatness.

In some examples, as shown in FIG. 11, the screen frame 3 further includes a plurality of protrusions 312 disposed on the frame body 30 to enhance the rigidity of the frame body 30 and to further improve the structural strength of the entire screen frame 3.

In some examples, an angle between a direction of the tension provided by the connecting member 4 to the connecting cloth 2 and a plane where the second surface 12 of the screen board 1 is located is less than or equal to 45 degrees and greater than or equal to 0 degrees. In this way, according to a working principle of the fixed pulley, the connecting cloth 2 may be more easily tensioned by the connecting member 4, and the screen board 1 may be always subjected to the tension in the direction away from the screen board 1 due to a force transmission of the connecting cloth 2. As a result, it may be easy to stretch the screen board 1 to the flat state.

For example, the direction of the tension provided by the connecting member 4 to the connecting cloth 2 is parallel to (as shown in FIG. 7) or approximately parallel to (as shown in FIGS. 11 and 12) the plane where the second surface of the screen board 1 is located. In this way, it may avoid increasing the thickness of the entire projection screen.

Based on the above description, the projection screen in the embodiments of the present disclosure may fix the screen board 1 through the connecting cloth 2, the connecting member 4 and the screen frame 3, and may use the tension provided by the connecting member 4 to make the connecting cloth 2 stretch to the flat state. As a result, through the transmission of force, the screen board 1 may also be stretched and extend to the flat state, which is beneficial to improve the flatness of the screen board 1, and makes the screen board 1 meet the flatness requirements required for display. In addition, when the connecting cloth 2 and the screen board 1 are connected together through bonding, even if the flatness of the screen board 1 is reduced during the bonding process (e.g., the uneven coating of the adhesive), the flatness of the screen board 1 may be ensured by using the tension provided by the connecting member 4 in the subsequent process. In addition, during the use of the projection screen, the screen board 1 will always maintain the flatness required for display, which is beneficial to ensure the quality stability of the projection images. In addition, the weights of the screen frame 3 (which is made of light metal material) and the connecting cloth 2 in the embodiments of the present disclosure are small and will not noticeably increase the weight of the entire projection screen, which facilitates transportation and suspension, and is beneficial for the enlargement of the size of the projection screen.

In some embodiments, as shown in FIGS. 11, 12 and 14, the projection screen further includes a decorative frame 6. The decorative frame 6 is configured to wrap the outer edges of the screen frame 3. The decorative frame 6 is connected to the screen frame 3, and covers the connecting cloth 2 exposed outside the screen board 1 to prevent the connecting cloth 2 from being exposed, so as to effectively improve the front appearance of the projection screen.

In some examples, the shape of the decorative frame 6 matches the shape of the screen frame 3. That is, the decorative frame 6 is of a hollow structure to wrap the outer edges of the screen frame 3.

For example, the decorative frame 6 is made of an aluminum-plastic material, but the embodiments of the present disclosure are not limited thereto. A surface of the decorative frame 6 away from the screen frame 3 may be processed through surface treatment processes such as electroplating, wire drawing or painting.

In some examples, the decorative frame 6 is composed of a plurality of sub-members that are connected to one another. As shown in FIG. 14, the sub-member includes a cover plate 601, a first connecting plate 602 and a second connecting plate 603. The cover plate 601, the first connecting plate 602 and the second connecting plate 603 are an integrated structure. That is, they are integrally formed. The cover plate 601 is disposed on an outer edge of the screen frame 3. The first connecting plate 602 is connected to the cover plate 601, and the first connecting plate 602 at least covers a portion of the connecting cloth 2 protruding from the edge of the screen board 1. An end of the second connecting plate 603 is connected to the cover plate 601, and another end of the second connecting plate 603 extends to the side of the screen frame 3 away from the screen board 1. In this way, the cover plate 601, the first connecting plate 602, and the second connecting plate 603 form a cavity capable of accommodating edges of the screen frame 3 and the connecting cloth 2.

In some examples, the first connecting plate 602 only covers a portion of the connecting cloth 2 protruding from the edge of the screen board 1.

In some other examples, the first connecting plate 602 covers not only the portion of the connecting cloth 2 protruding from the edge of the screen board 1, but also an edge of the first surface 11 of the screen board 1. In this way, the cover plate 601, the first connecting plate 602, and the second connecting plate 603 form a cavity capable of accommodating edges of the screen frame 3, the connecting cloth 2 and the screen board 1. The sub-members may protect the edges of the screen board 1.

For example, an inner wall of the first connecting plate 602 is in direct contact with the first surface of the screen board 1, so that the edge of the screen board 1 may be tightly attached to the connecting cloth 2, which may be beneficial to ensure the flatness of the screen board 1.

For another example, the screen board 1 and the inner wall of the first connecting plate 602 have a gap therebetween, which may avoid collision between the screen board 1 and the sub-members when the screen board 1 expands with heat.

In some examples, the end of the cover plate 601 connected to the first connecting plate 602 is bent, and another end of the cover plate 601 connected to the second connecting plate 603 is bent.

In a case where the screen frame 3 includes the support portion 31, the second connecting plate 603 may be disposed at the side of the support portion 31 away from the screen board 1. In this way, the thickness of the entire projection screen may not be increased.

The sub-members in the decorative frame 6 and the screen frame 3 may be connected through clamping, bonding or threaded connection. A description will be made below by taking an example where the second connecting plate 603 is disposed at the side of the support portion 31 away from the screen board 1.

Figure 15:
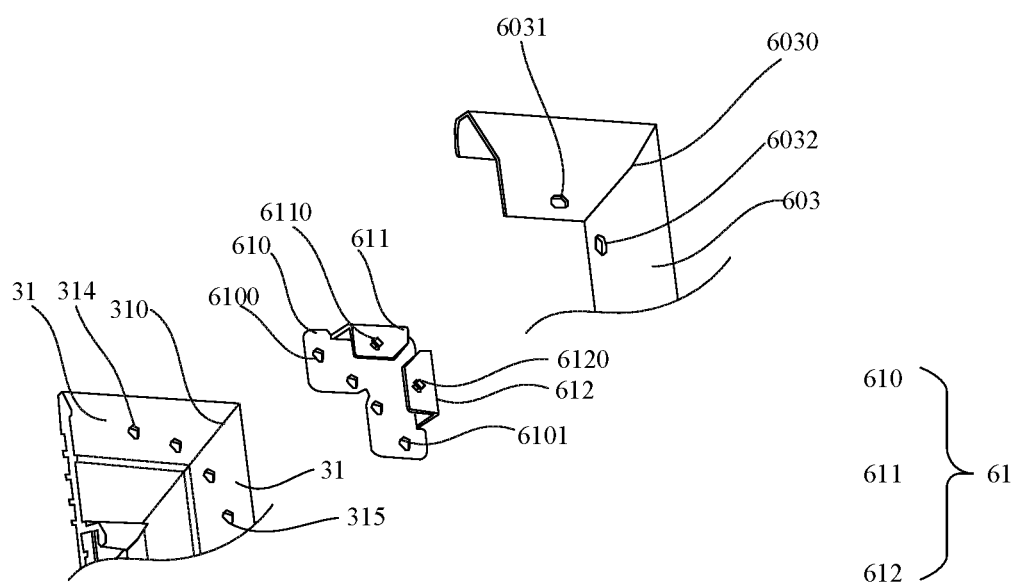
FIG. 15 is a schematic diagram showing a connection between a decorative frame and a screen frame of another projection screen, in accordance with some embodiments.

In some examples, as shown in FIG. 15, the projection screen further includes at least one first connector 61, and the decorative frame 6 is connected to the screen frame 3 through the at least one first connector 61. Two adjacent support portions 31 of the screen frame 3 form a first corner portion 310 at a junction thereof. Two adjacent second connecting plates 603 of the decorative frame 6 form a second corner portion 6030 at a junction thereof. Each first connector 61 is disposed between a first corner portion 310 and an adjacent second corner portion 6030.

For example, the first connector 61 includes a first fixing plate 610, a first fixing block 611 and a second fixing block 612. The first fixing plate 610 is connected to the support portion 31. The first fixing block 611 and the second fixing block 612 are connected to edges of a surface of the first fixing plate 610 away from the support portion 31, and are connected to two second connecting plates 603. The first fixing block 611 or the second fixing block 612 may be connected to the first fixing plate 610 through riveting, welding, or the like.

In some examples, as shown in FIG. 15, the first fixing plate 610 is provided with at least one first through hole 6100 and at least one second through hole 6101. One of two adjacent support portions 31 is provided with at least one first mounting hole 314 that is matched with the at least one first through hole 6100, and another support portion 31 is provided with at least one second mounting hole 315 that is matched with the at least one second through hole 6101.

In this way, by arranging the first through hole 6100 and the first mounting hole 314 that are matched with each other, and the second through hole 6101 and the second mounting hole 315 that are matched with each other, the first fixing plate 610 and the two support portions 31 may be connected through threaded connection.

The number of the first through holes 6100 and the number of the second through holes 6101 are not limited. For examples, as shown in FIG. 15, there are two first through holes 6100 and two second through holes 6101, and accordingly, there are two first mounting holes 314 and two second mounting holes 315.

In some examples, as shown in FIG. 15, the first fixing block 611 is provided with at least one third through hole 6110, and the second fixing block 612 is provided with at least one fourth through hole 6120. One of two adjacent second connecting plates 603 is provided with at least one third mounting hole 6031 that is matched with the at least one third through hole 6110, and another second connecting plate 603 is provided with at least one fourth mounting hole 6032 that is matched with the at least one fourth through hole 6120.

In this way, the first fixing block 611 and the second fixing block 612 may achieve threaded connections with corresponding second connecting plates 603, respectively.

The number of the third through holes 6110 and the number of the fourth through holes 6120 are not limited. For examples, as shown in FIG. 15, there is one third through hole 6110 and one fourth through hole 6120, and accordingly, there is one third mounting hole 6031 and one fourth mounting hole 6032.

It will be noted that, that the first fixing block 611 and the second fixing block 612 are connected to the two adjacent second connecting plates 603 respectively, means that two adjacent sub-members may also be connected through the first connector 61. In this way, two adjacent sub-members in the decorative frame 6 may not need to be directly connected. Of course, the two adjacent sub-members in the decorative frame 6 may also be directly connected through other manners such as threaded connection, riveting, and welding.

In some examples, the two adjacent sub-members are not directly connected, the at least one first connector 61 includes two first connectors 61, and the two first connectors 61 are disposed between two first corner portions 310 located on the diagonal of the screen frame 3 and corresponding second corner portions 6030, respectively.

Of course, in this case, a first connector 61 may be disposed between each first corner portion 310 and a corresponding second corner portion 6030 (for example, the number of the first connectors 61 is four), so as to improve the connection reliability of the sub-members and the screen frame 3.

In a case where the two adjacent sub-members are directly connected, the plurality of sub-members in the decorative frame 6 are connected sequentially to form an integrated structure. In this case, the at least one first connector 61 may include one first connector 61.

Of course, in this case, the at least one first connector 61 may include a plurality of first connectors 61, so as to improve connection reliability of the decorative frame 6 and the screen frame 3. For example, the at least one first connector 61 includes two first connectors 61, and the two first connectors 61 are disposed between the two first corner portions 310 located on the diagonal of the screen frame 3 and the corresponding second corner portions 6030, respectively. For another example, the at least one first connector 61 includes four first connectors 61, and the four first connectors 61 are disposed between four first corner portions 310 and corresponding second corner portions 6030, respectively.

In some other examples, as shown in FIG. 14, the projection screen further includes at least one second connector 62, and the decorative frame 6 is connected to the screen frame 3 through the at least one second connector 62. Each second connector 62 is disposed between a second connecting plate 603 and a corresponding support portion 31.

For example, the second connector 62 includes a second fixing plate 620, a third fixing plate 621, and a third connecting plate 622 connecting the second fixing plate 620 and the third fixing plate 621. The second fixing plate 620 is configured to be connected to the support portion 31, the third fixing plate 621 is configured to be connected to the second connecting plate 603, and the connections between the second fixing plate 620 and the support portion 31, and between the third fixing plate 621 and the second connecting plate 603 may be achieved through means such as threaded connection, riveting, or welding.

A distance between the second fixing plate 620 and the third fixing plate 621 may be set to be slightly greater than a distance between the second connecting plate 603 and the support portion 31. In this way, the second connecting plate 603 may be subjected to a pressing force in a thickness direction of the screen board 1, so that the sub-member may be tightly fixed to the screen frame 3, which may be beneficial to improve the connection reliability between the two.

For example, two adjacent sub-members in the decorative frame 6 are not directly connected, and the number of the at least one second connector 62 is equal to the number of the sub-members, so that each sub-member may be connected to the screen frame 3 through one second connector 62. For another example, if two adjacent sub-members in the decorative frame 6 are directly connected, the at least one second connector 62 may include one or more connectors 62. For example, each sub-member may be connected to the screen frame 3 through one second connector 62, so as to improve the reliability of connection between the sub-member and the screen frame 3, The at least one first connector 61 and the at least one second connector 62 may both be metal elements, which is not limited thereto. The metal element has high structural strength. In this way, regardless of using the first connector 61 or the second connector 62 to realize the connection between the decorative frame 6 and the screen frame 3, the decorative frame 6 and the screen frame 3 have high connection strength and connection reliability.

In yet some other examples, the projection screen includes both the first connector 61 and the second connector 62. Details may be referred to the above description, which will not be described herein again.

In the above embodiments, the fixation installation of the related structures of the screen frame 3 and the decorative frame 6 may not adversely affect the screen board 1. For example, a process of fixing the decorative frame 6 through the first connector 61 and/or the second connector 62 is performed at the side of the screen frame 3 away from the screen board 1. In this way, it may be beneficial to ensure the flatness of a side of the screen frame 3 proximate to the screen board 1, which may ensure the flatness of the screen board 1 without causing damages to the screen board 1. Moreover, in a subsequent process of disassembling the decorative frame 6 or the screen frame 3, the process may be performed only at the side of the screen frame 3 away from the screen board 1.

Figure 16:
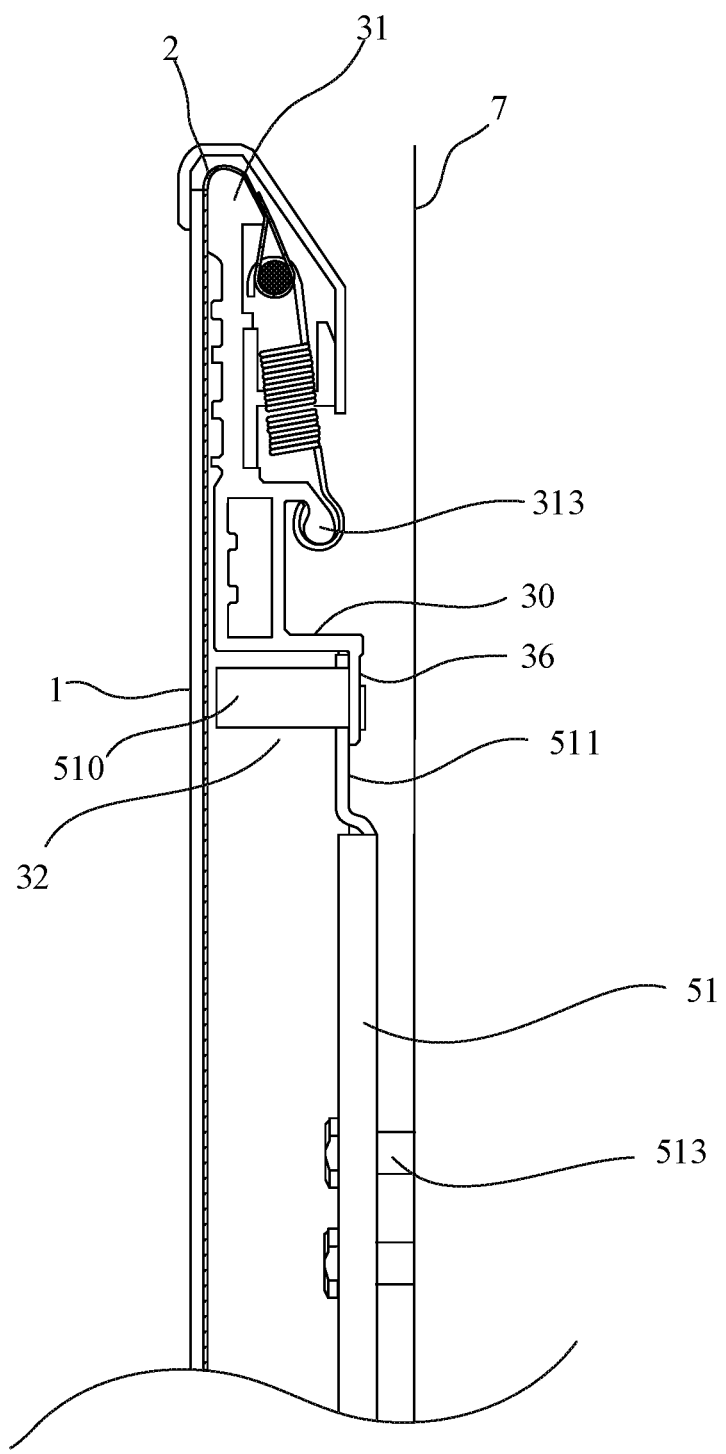
FIG. 16 is a schematic diagram showing installation of a projection screen and a vertical surface, in accordance with some embodiments.

As shown in FIG. 16, the projection screen is usually fixed on a vertical surface 7 such as a wall. In order to fix the projection screen, in some embodiments, the screen frame 3 has a mounting groove 32 having a shape of a rectangle with an opening. The mounting groove 32 may be formed in the following way. In some examples, as shown in FIGS. 7, 11, 12, and 16, the screen frame 3 further includes at least one mounting plate 36 extending from the frame body 30 towards the hollow region 301 and parallel to the vertical surface 7, and the at least one mounting plate 36 is disposed at at least one of the upper and lower sides of the hollow region 301 in a vertical direction (i.e., an extending direction of the vertical surface 7). The screen frame 3 further includes two baffles 50 connected to each mounting plate 36 at both sides of the mounting plate 36 in a horizontal direction perpendicular to the vertical direction, and the two baffles 510 extend towards the screen board 1. In this way, the mounting groove 32 is formed by the at least one mounting plate 36, the baffles 510, the frame body 30 and the screen board 1. Accordingly, the screen frame 3 further includes a hanger assembly 5 for connecting the mounting groove 32 to the vertical surface 7. In this way, the mounting groove 32 may be used to hook or clamp the projection screen onto the vertical surface 7.

The mounting plate 36 may extend from the inner edge of the frame body 30 towards the hollow region 301, so that the entire mounting plate 36 is located in the hollow region 301. In this way, the mounting plate 36 may not increase the thickness of the entire projection screen.

For example, the mounting plate 36 is disposed at a lower side of the hollow region 301 in the vertical direction.

For another example, the mounting plates 36 are disposed at the upper and lower sides of the hollow regions 301 in the vertical direction, and the two mounting plates 36 are disposed opposite to each other. In this case, a distance between two adjacent ends of the two opposite mounting plates 36 is greater than or equal to a dimension of the hanger assembly 5 in the vertical direction, so that a hook end 511 of the hanger assembly 5 may smoothly enter the mounting groove 32.

In this way, as for the projection screen, the screen frame 3 may also fix the entire projection screen onto the vertical surface 7 in addition to fixing the screen board 1. In other words, there may be no need to provide an additional structure for fixing the projection screen to the vertical surface 7, which may simplify the structure of the projection screen and may reduce a distance between the projection screen and the vertical surface 7. In addition, it may also avoid adverse effects on the projection screen due to processing or installation errors of other structures.

Figure 17:
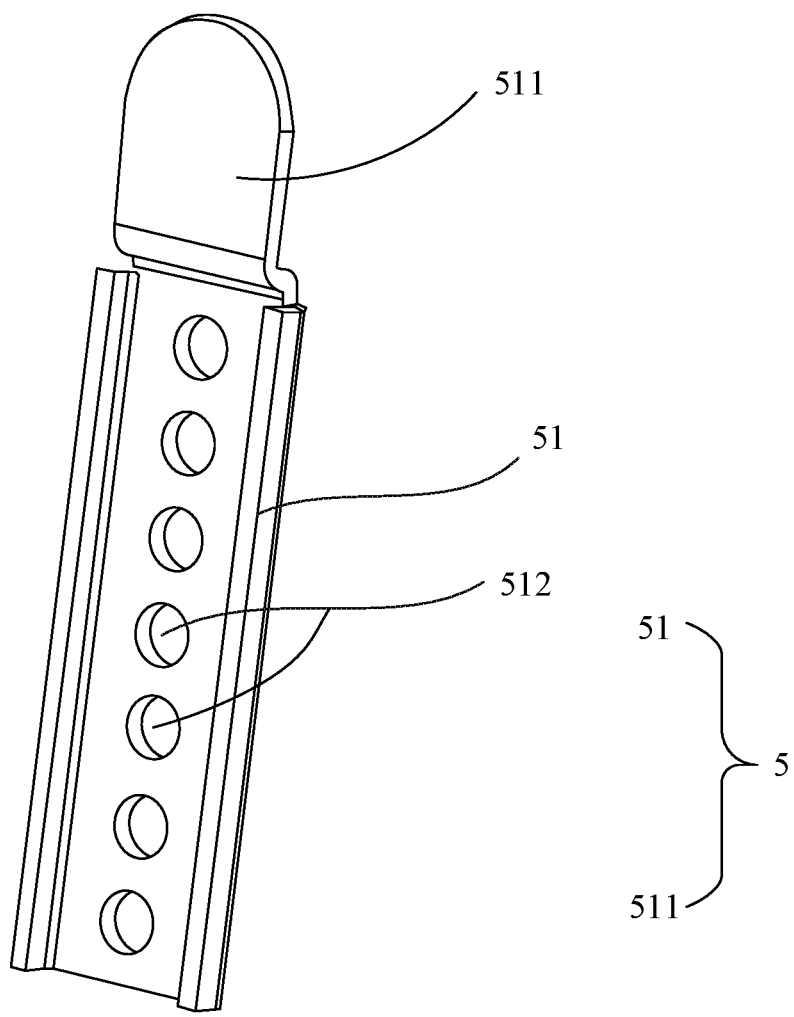
FIG. 17 is a schematic diagram of a hanger assembly, in accordance with some embodiments.

For example, as shown in FIGS. 16 and 17, the hanger assembly 5 includes a support member 51 extending in the vertical direction and at least one hook end 511 disposed at a corresponding end of the support member 51, and the hook end 511 is configured to be inserted into the mounting groove 32 to support the screen frame 3.

As shown in FIG. 17, the support member 51 may be provided with a plurality of fixing holes 512 spaced apart in the vertical direction. The fixing holes 512 are configured to allow positioning bolts 513 to pass through, so as to fix the support member 51 and the vertical surface 7.

In an example where the vertical surface 7 is the wall, a position of the support member 51 relative to the wall in the vertical direction is adjustable. That is, when the support member 51 is mounted, the support member 51 may move in the vertical direction relative to the wall, so as to change a height of the support member 51 relative to the ground. In this way, the height of the screen frame 3 (i.e., the height of the projection screen) may be adjusted accordingly.

In order to support and hang the projection screen, the hook end 511 may have various shape.

In some examples, the shape of the hook end 511 matches the shape of the mounting groove 32 of the screen frame 3. For example, a cross-section of the mounting groove 32 taken along a direction parallel to the first surface 11 of the screen board 1 is in a shape of a rectangle, and the hook end 511 is in a shape of a rectangle matching the shape of the mounting groove 32. A thickness of the rectangular hook end 511 is in a range of approximately 1.5 mm to approximately 2 mm, so that the hook end 511 can be stuck in the mounting groove 32 to reduce or eliminate the shaking of the hook end 511 in the mounting groove 32, which may ensure that the screen frame 3 and the support member 51 are reliably fixed. For example, the thickness of the hook end 511 is 1.5 mm, 1.7 mm, 1.9 mm or 2 mm, or any thickness between any two of these values.

In some other examples, as shown in FIG. 17, the cross-section of the mounting groove 32 taken along the direction parallel to the first surface 11 of the screen board 1 is in a shape of a rectangle, and an edge of the hook end 511 away from the support member 51 may be configured as an arc surface. In this way, a certain relative sliding can be generated between the hook end 511 and the mounting groove 32, so that the position of the frame body 30 relative to the hook end 511 may be adjusted. As a result, when subjected to an external force, the frame body 30 can easily move or rotate relative to the hook end 511 to facilitate adjustments of the position and angle of the projection screen on the wall.

Some embodiments of the present disclosure provide a projection system. The projection system includes a projection device and the projection screen in any of the above embodiments, and the projection device is configured to project images onto the screen board 1 of the projection screen.

In some embodiments, the projection device is a projector, such as a CRT projector, an LCD projector, a DLP projector, or a laser projector.

The foregoing descriptions are merely some specific implementation manners of the present disclosure, but the protection scope of the present disclosure is not limited thereto, and the changes or replacements that any person skilled in the art can easily think of in the technical scope disclosed by the present disclosure should be within the protection scope of the present disclosure. Therefore, the protection scope of the present disclosure shall be subject to the protection scope of the claims.

What is claimed is:

1. A projection screen, comprising:
   a screen board having a first surface and a second surface opposite to each other, the screen board having a light receiving region and an edge region surrounding the light receiving region;
   a connecting cloth disposed on the second surface of the screen board, at least one edge of the connecting cloth protruding from a corresponding edge of the screen board;
   at least a portion of the second surface of the screen board located in the edge region being connected to the connecting cloth;
   a screen frame having a hollow structure, an orthographic projection of the screen board on a plane parallel to the first surface being located within an outer border of an orthographic projection of the screen frame on the plane, and each edge of the connecting cloth being connected to the screen frame; and
   at least one connecting member connecting at least one edge of the connecting cloth to the screen frame, the at least one connecting member being configured to provide a tension to the connecting cloth,
   wherein the screen frame includes a plurality of support portions, the plurality of support portions are supported on the second surface of an edge of the screen board, each edge of the connecting cloth protrudes from a corresponding edge of the screen board, and is bent in a direction away from the screen board so that the edge of the connecting cloth wraps an edge of a corresponding support portion away from a frame body and extends to a side of the screen frame away from the screen board, and
   wherein a portion of the edge of the connecting cloth extending to the side of the screen frame away from the screen board is connected to the screen frame through the at least one connecting member.

2. The projection screen according to claim 1, wherein the at least one connecting member includes a spring, a rubber member, an elastic silica gel member, or a magnetic adsorption member.

3. The projection screen according to claim 1, wherein the connecting cloth entirely covers the second surface of the screen board.

4. The projection screen according to claim 1, wherein the at least one connecting member includes a plurality of connecting members, each edge of the connecting cloth protrudes from a corresponding edge of the screen board, and is connected to the screen frame through at least one of the plurality of connecting members.

5. The projection screen according to claim 4, wherein the at least one of the plurality of connecting members connected to the edge of the connecting cloth includes multiple connecting members, and the multiple connecting members are equally spaced.

6. The projection screen according to claim 1, further comprising at least one first reinforcing structure, wherein each first reinforcing structure is enabled to be in direct contact with an edge of the connecting cloth protruding from a corresponding edge of the screen board, and the first reinforcing structure is configured to reinforce a structure of the edge.

7. The projection screen according to claim 6, wherein the at least one first reinforcing structure is a rod member;
   the edge of the connecting cloth protruding from the corresponding edge of the screen board forms a through hole configured to accommodate the rod member, the through hole extends in an extending direction of a corresponding side of the screen board, and the rod member is disposed in the through hole, the edge of the connecting cloth has at least one group of openings, and each group of openings corresponds to one connecting member, and the group of openings includes at least one opening configured to allow a portion of the corresponding connecting member to pass through, so that the corresponding connecting member is connected to the rod member through the group of openings.

8. The projection screen according to claim 7, wherein the rod member and the corresponding connecting member are both located at a side of the screen frame away from the screen board.

9. The projection screen according to claim 6, wherein the first reinforcing structure is a thickening cloth layer.

10. The projection screen according to claim 1, further comprising a polyurethane layer disposed on a surface of the connecting cloth proximate to the screen board, wherein the polyurethane layer is at least located in a region where the connecting cloth is connected to the screen board.

11. The projection screen according to claim 1, wherein an outer border of the orthographic projection of the screen board on the plane is located within the orthographic projection of the screen frame on the plane.

12. The projection screen according to claim 11, wherein the screen frame further includes:

the frame body having a hollow region, wherein the plurality of support portions of the screen frame each directly connected to a corresponding side face of the frame body facing away from the hollow region, the outer border of the orthographic projection of the screen board on the plane is located within orthographic projections of the plurality of support portions on the plane, and edges of the plurality of support portions away from the frame body are outer edges of the screen frame.

13. The projection screen according to claim 12, wherein the at least one connecting member is a pull spring, and one end of the pull spring is a hook, and the screen frame further includes at least one connecting structure connected to the frame body or at least one of the support portions, and the at least one connecting structure is configured to fix the hook.

14. The projection screen according to claim 12, wherein the at least one connecting member is configured to provide the tension to the connecting cloth in a direction, an angle between which and a plane where the first surface of the screen board is located is less than or equal to 45 degrees, and greater than or equal to 0 degrees.

15. The projection screen according to claim 12, wherein the screen frame further includes a plurality of protrusions disposed on a surface of each support portion proximate to the connecting cloth and/or away from the connecting cloth.

16. The projection screen according to claim 15, wherein the plurality of protrusions are disposed on the surface of the support portion proximate to the connecting cloth, and surfaces of the plurality of protrusions proximate to the connecting cloth are parallel to a plane where the second surface of the screen board is located, and surfaces of at least part of the plurality of protrusions proximate to the connecting cloth are in direct contact with the connecting cloth.

17. The projection screen according to claim 12, wherein the screen frame further includes at least one first reinforcing beam that spans across the hollow region and is fixed to the frame body.

18. The projection screen according to claim 12, wherein the screen frame has a mounting groove having a shape of a rectangle with an opening, the screen frame further includes a hanger assembly inserted into the mounting groove, and the hanger assembly is capable of being fixed on a vertical surface.

19. The projection screen according to claim 1, further comprising a decorative frame connected to the screen frame, wherein the decorative frame is configured to wrap outer edges of the screen frame.

20. A projection system, comprising a projection device and the projection screen according to claim 1, wherein the projection device is configured to project images onto the screen board of the projection screen.

* * * * *